United States Patent [19]
Pryor

[11] Patent Number: 5,380,978
[45] Date of Patent: Jan. 10, 1995

[54] METHOD AND APPARATUS FOR ASSEMBLY OF CAR BODIES AND OTHER 3-DIMENSIONAL OBJECTS

[76] Inventor: Timothy R. Pryor, 6360 Hawthrone Drive, Windsor, Ontario, Canada, N8T 1J9

[21] Appl. No.: 728,682
[22] Filed: Jul. 12, 1991
[51] Int. Cl.⁶ ............................................. B23K 26/00
[52] U.S. Cl. .......................... 219/121.64; 219/121.79; 219/121.83
[58] Field of Search ...................... 219/121.63, 121.64, 219/121.78, 121.79, 121.83, 121.82, 121.67

[56] References Cited

U.S. PATENT DOCUMENTS

| | | | |
|---|---|---|---|
| 4,654,505 | 3/1987 | Sciaky et al. | 219/121.63 |
| 4,733,047 | 3/1988 | Cruickshank et al. | 219/121.63 |
| 4,997,283 | 3/1991 | Danielson et al. | 356/375 |
| 4,998,005 | 3/1991 | Rathi et al. | 219/121.83 |
| 5,005,277 | 4/1991 | Uemura et al. | 29/407 |
| 5,010,634 | 4/1991 | Uemura et al. | 29/407 |
| 5,026,967 | 6/1991 | Bell et al. | 219/121.64 |
| 5,045,668 | 9/1991 | Neiheisel et al. | 219/121.83 |
| 5,047,609 | 9/1991 | Ekstrand | 219/121.78 |
| 5,064,991 | 11/1991 | Alborante | 219/121.63 |
| 5,115,115 | 5/1992 | Alborante | 219/121.63 |
| 5,124,524 | 6/1992 | Schuster et al. | 219/121.78 |
| 5,148,591 | 9/1992 | Pryor | 29/407 |

Primary Examiner—C. L. Albritton
Attorney, Agent, or Firm—Larson and Taylor

[57] ABSTRACT

In the manufacture of car bodies—particularly what is called the "body-in-white" (BIW), the as-welded body without the doors, engine, transmission, etc., and major sub-assemblies thereof. or other "3-D" structures, such as planes, ships, trucks, buildings and the like there is used optically visible datums (in UV, visible, and IR wavelengths) on the part which are either functional (that is used for assembly or other purposes, such as a hole) or simply for the purpose of optically guided positioning, either manually or automatically. These datums, typically holes, painted, engraved, or retroreflective targets, either by themselves, or in combination with other features of the part such as edges, are observed by optical sensor/camera systems in and/or surrounding the work area. One or more positioning means either automatic, semi-auto, or manual, are guided by the signals from the cameras to cause the requisite parts to be positioned in the proper location. The parts are then joined, such as by laser welders. Adaptive control of position can include many variables such as forces, previous history ("learning"), etc.

20 Claims, 9 Drawing Sheets

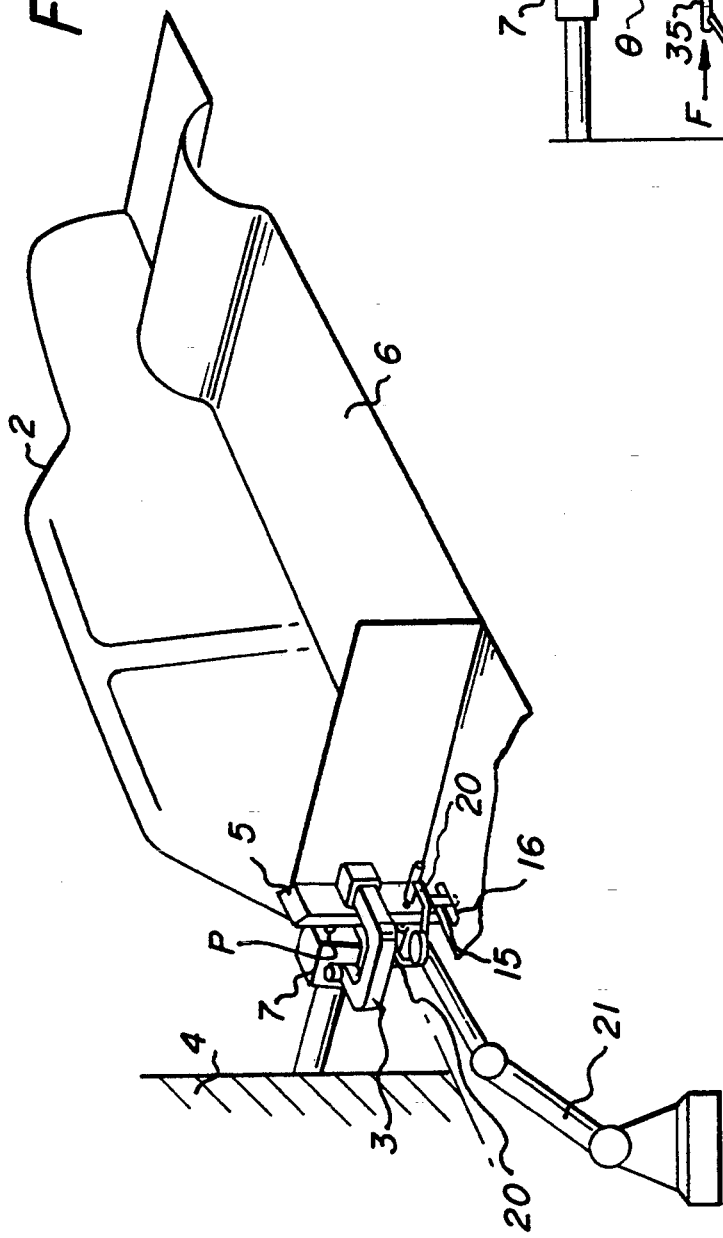
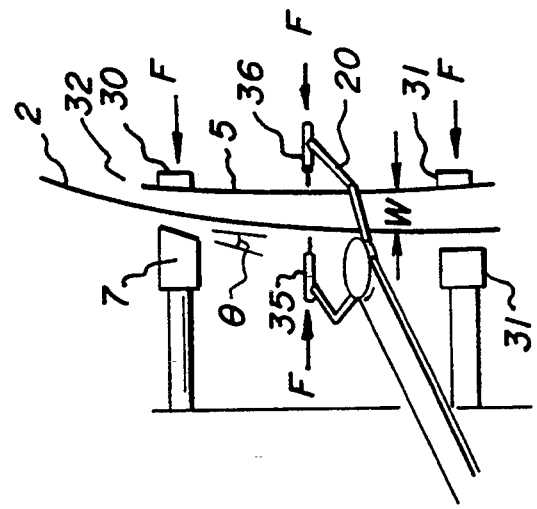
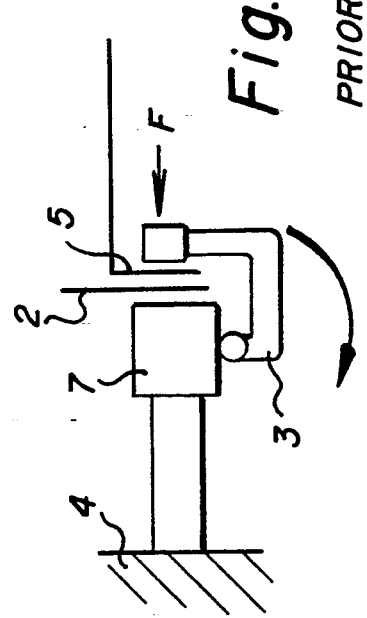

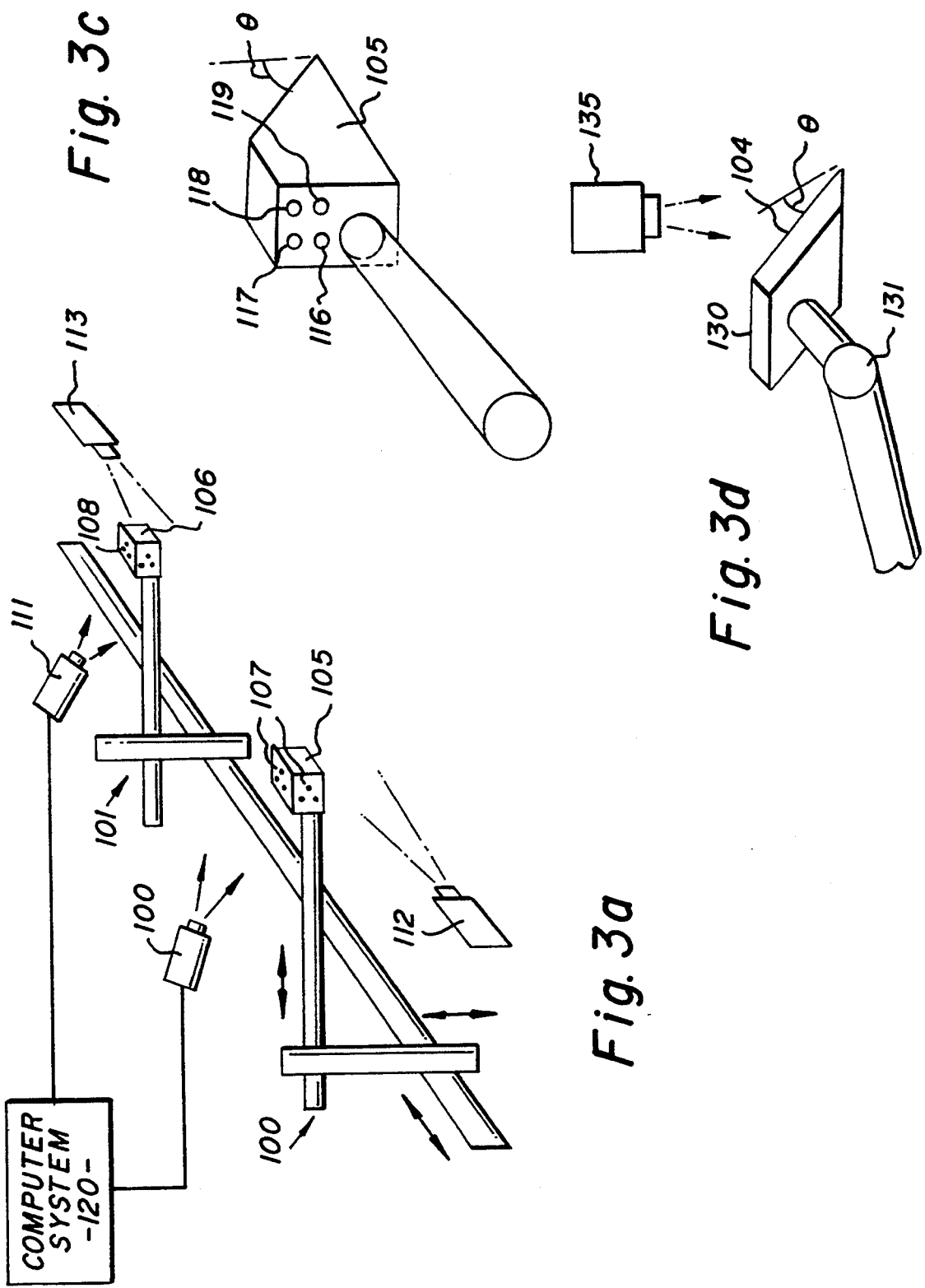

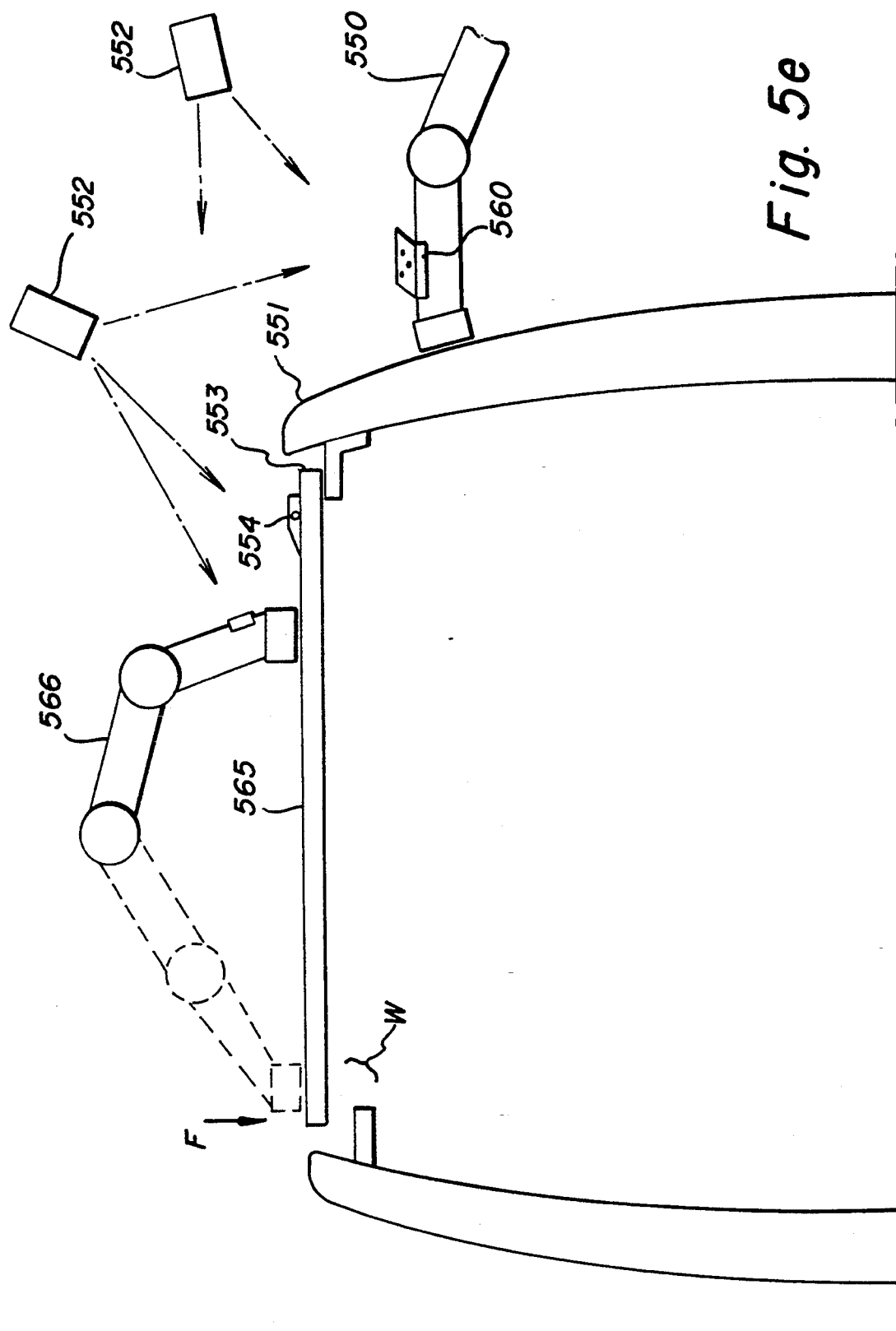

5,380,978

METHOD AND APPARATUS FOR ASSEMBLY OF CAR BODIES AND OTHER 3-DIMENSIONAL OBJECTS

FORWARD

An earlier patent application by the inventor, "Vision Target Based Assembly" (U.S. Ser. No. 07/110,541) now U.S. Pat. No. 5,148,591 has described a method for assembling objects to one another utilizing optical target dams, wherein the optical system adaptively controls the positioning and placement of the objects to be assembled in three dimensional space.

Another copending application "Vision Assisted Fixture Construction" (Ser. No. 07/382,497) now U.S. Pat. No. 4,851,905 describes the use of optical target based systems for construction of tooling fixtures.

The manufacture of car bodies is a complex process, and the tooling required to make the various component pieces and assemble them into a dimensionally correct, aesthetic shape consumes a great deal of money and time. Current trends in the industry are to ever shorten the time involved and to lower cost. This invention assists this goal. Two basic variations of the invention are disclosed: A Fully Flexible Assembly Process (nicknamed "Fixtureless" Assembly), and RER, or Rapidly Erectable/Repositionable Assembly Fixtures, and Associated Processes, useable in more or less conventional body and sub-assembly fabrication.

The invention is particularly suited for:
 a) Construction of fabricated assemblies with rapidly configurable and reconfigurable tools
 b) Assembly with loosely configured tools augmented by human or robotic means
 c) Construction of dimensionally correct assemblies substantially by robotic or human means, or mixture of the two—without resort to fixed "hard" tooling.

An important and generally preferred element of the invention is the use of optically visible datums (in UV, visible IR wavelengths) on the part which are either functional (that is used for assembly or other purposes) or simply for the purpose of optically guide positioning, either manually or automatically. These datums, typically holes, painted or retroreflective targets, are observed by optical sensor/camera systems in and/or surrounding the work area. One or more positioning means either automatic/semi auto or manual, are guided by the signals from the cameras to cause the requisite parts to be positioned in the proper location. The parts are then joined using means such as laser welders, adhesives, etc.

This process can be self checking and adaptive in the sense that errors or distortions created in the structure by joining at one location can be accounted for at one or more further locations by repositioning of the pieces or distorting them in the proper manner to remove, or at least ameliorate, the previous distortion. This reduces error propogation and can intelligently be used to force error to zero in the body build.

While primarily aimed at car body assembly, the disclosed invention is useful for assembly of aircraft, trucks, ships and potentially buildings and other structures.

This invention is a continuation in part of my previous co-pending applications, entitled:

Vision Target Based Assembly (Ser. No. 07/110,541) now U.S. Pat. No. 5,148,591
Vision Assisted Fixture Construction (Ser. No. 07/382,497) now U.S. Pat. No. 4,851,905
Robot Vision using comers, holes and other object features (Ser. No. 07/451,958)
Method of Robotically Handling and working on objects (TGTS II)
Target Based determination of . . . (Ser. No. 07/291,692 or U.S. Pat. No. 4,796,200

INTRODUCTION

Automobile bodies today are assembled using what is commonly referred to as "fixture tooling" usually in volumes over one hundred thousand per year, per plant. This tooling, which is typically hand fabricated from thick steel, is fixed in place—i.e. "hard", and is used to position the parts precisely for assembly (typically welding). It is very costly since it is custom built, difficult to maintain and is further of exceptionally long lead time since it must be precisely made. In addition it is not immediately reliable, and often takes months to "debug" along with associated metal fit problems of the panels provided. Finally such tooling is "Dumb", providing no process feedback.

These factors impede the manufacturer's ability to come out with new car models in a timely manner to meet market needs. They furthermore saddle the manufacturer with a large tooling amortization cost which, though practical in large production quantities such as 200,000 bodies of the same type per year, may be totally impractical when amortized over low volumes of 10,000–20,000 per year. These numbers seem small but several cars with quite popular name plates have unfortunately been selling in just these quantities recently and numerous articles have been written over the fragmentation of the industry, into "niche" markets.

The hard tooling not only takes a long time to build, it also takes a long time to get running properly. This is because the parts seldom fit together as they are supposed to and the tooling is often changed after the fact, idling the rest of the line in the process. Finally, even on a running line there is substantial maintenance associated with keeping the various parts of today's tools operational.

The invention solves many of these problems. One fully flexible version of the invention allows the prototype construction of bodies to be made with the same equipment as final production, where for the first time fabrication techniques and programs checked out in the prototype phase maybe directly used to make the final production. While suited perhaps best for the lower volumes, such tooling can be scaled up, if the car begins to sell, to produce higher volumes to buy time if needed while more conventional tooling might be constructed, at which point the tooling of the invention can be turned over to build other models.

The fully flexible version of the invention also has a substantial benefit where laser welding and other non-contact joining processes are used. This is because the process adaptively brings the parts together in a way where everything is sensed. That is, where many if not all of the pertinent variables are sensed such as location of each of the parts—the robotic or other manipulators, even humans used to position the part—one can therefore ensure that the parts are indeed in contact which is virtually required for successful laser welding or bonding.

This is not the case with a conventional fixture, where one does not know at all what the exact situation is. Conventionally, one assumes that because clamps have clamped a piece at various locations, that all locations, including the intermediate locations are indeed in contact. But this is often not the case if the material or the parts are out of specification, bent or what have you. Even at the clamp points, clap failure can occur. Conventional spot weld guns obviate some of this problem by locally clamping using the gun, but this cannot be easily done with the otherwise very desirable laser weld technique.

While the fully flexible system described herein can be generated in a totally automatic manner, it is of particular interest to consider use with humans to loosely position and tab/slot or otherwise temporarily join the parts together, using the invention to provide final positioning and rigid/semi-rigid holding while welding or joining occurs. (Semi-rigid is made possible by the laser joining processes, as no threes are exerted on the parts to effect the weld, only to hold them in contact.)

Also described is another related embodiment, code named here "RER" or Rapidly Erectable/Reconfigurable tooling. This system, derived from my invention "Vision Assisted Fixture Construction" and further incorporating features of the above flexible invention, can allow very quick set up and change over of conventional locating and clamping fixtures. Some elements can be used in a general line control system for conventional lines, capable of monitoring critical locator and robot locations. Others can be used for assembly of vehicles having space frame construction and the like, by accurately positioning locating pads for panels which attach to the space frame.

A major advantage of the invention is that it can be used to produce different models. If one model doesn't sell you don't have its assembly tooling cost (and critical plant space) tied up, you simply switch over. The amortization period of the new type of tooling will be limited only by wear and not the life of the vehicle itself. This means that maybe three or possibly four vehicles lifetimes could be experienced compared to the situation which exists today. In addition, running changes can be easily Incorporated where only a portion of the vehicle is changed to "freshen it".

Very helpful in both of the above systems are related inventions for laser targeting of panels and other parts, and selectively lockable tools and joints.

BACKGROUND

In the process of developing a car today, first pieces produced are assembled into prototype vehicles which can then be used for consumer evaluations, engineering tests and safety, emissions, fuel economy tests with the government. The sooner such prototypes are ready, the shorter the process becomes.

After the prototypes, the first run of pilot vehicles are built, next, it is then imperative to get the first vehicles of an approved project to the showroom. The question then is how to produce these vehicles in the shortest possible time frame realizing however, that they have to be dimensionally correct—often times to a few thousandths of an inch (0.1 mm), in many of the critical sealing or chassis dimensions.

In bygone days when dimensions were not so critical, tooling jigs could be hastily slapped together to support the various pieces of the car such that the vehicles could be produced. Slowly as the production evolved, one could adjust the jigs to make the body better to a degree. Today however, it is impossible to sell a car that has poor body dimensional fits. Furthermore the consumer magazines and opinion leaders test these early vehicles and form judgments that may linger for the vehicle lifetime.

Today, there are at least two different sages of potential tooling production; one for the initial prototypes; e.g. 200–300 units, and, production tooling used to produce however many cars will sell. In this latter regard it is noted that while many cars have been built with tools that could produce 200,000 vehicles a year, the actual market has not been so kind and the cost of such tooling become an enormous burden if sales are only 15,000 for example per year.

It not generally known in the art how to produce dimensionally accurate bodies without resulting to expensive fixed hard tools of the high production kind, at least if "world class" in dimensional precision is needed. (0.1 millimeter precision for the location of the various mating surfaces and hole to hole locations are critical to the function of the body and its chassis components.)

Another problem with present production results if one does build such dimensionally accurate "production hardened" tools, one is often precluded from changing to other bodies rapidly if the intended one does not sell. Although certain attempts have been made with interchangeable tool plates such as the Comau "Robogate" or the Renault systems; these solutions are "brute force", and in any case are still practically limited to a relatively small number of different bodies e.g. 4. And too, in the case of the conventional tooling for example a body is often thought to be different even though it might be the same car but in a sedan or coupe version, or a different name plate, with slight differences in the basic platform.

While at least one attempt worldwide has been made to provide completely programmable body tools (the Volkswagen "Geobox"), this is very expensive and in any case poses the question of exactly where in location the programmable details are, i.e. a control problem.

Few similar attempts have been made to flexibly produce the smaller subassemblies, such as doors, underbodies, side flames, etc., which often form a critical bottleneck, This invention seeks to solve all of the above problems and particularly forms an economic and unitary flexible production system for all bodies from the earliest prototypes all the way through to production of at least 5,000 units. The system further is expandable into low cost rapidly changeable tooling which can produce 200,000/yr.

In addition the system invention described has several additional features simply not obtainable in today's conventional body-building technology:
1. The ability of each individual operation to build on the dimensional data of the previous operations by feed forward of such data.
2. The ability of the system to "learn" from both past bodies produced for example from an earlier pilot stage and to correct the individual operations as a result of learned data. This is particularly of interest where the components (e.g. sheet metal) provided are less than correct and one must make for adjustments for particular runs of components that are deviant in their dimensions. Conventional tooling can't do this at all. People have to come over and try to catch the problem and do something with it manually—a difficult task in a "hard" fixture tool.
3. The system of the invention can inspect its own work and can continually upgrade its own data for the learning process, as well as feedback information to suppliers.
4. Some of the embodiments disclosed are totally reprogrammable.
5. All data points may be known for each part and assembly. Because the system can inspect its own work and learn from it, and previous assemblies, it can also be used to optimally produce a "best fit model" for how the car should be put together and for any dimensional changes that need to made to the pieces in order to enable a better fit (or to provide a customer acceptable fit with less than perfect pieces—a usual start-up problem). Because it takes data on every piece as the assembly is built up, all data needed is available. This is simply unobtainable on any form with today's technology.
6. The system is built on dimensional data which can be interpreted directly through a CAD system without going through the intermediate stage of building a tool from a clay or other mock up body which has been converted to the tool coordinates. This saves tolerance stack-up and potential dimensional error from creeping in. Today for example, the body CAD data are used to create a tool design, whose manufacturer creates errors which then propagate back to the body. So the final body produced has had two steps for error propagation—the tool and the body manufacture, Finally the optical sensor adaptive control system described is usuable for both totally programmable robotic part positioning as well as for positioning conventional tooling such as NC blocks and locators used in high volume assembly. Of importance is that variations of each, incorporating some fixed rapidly repositionable details, and some programmably repositionable details are possible with the invention.

Other features for both total programmable flexible automation and reconfigurable hard tools will become apparent from consideration of the embodiments.

DESCRIPTION OF THE PRIOR ART

FIG. 1 illustrates one aspect of the assembly of the body-in-white as is conventionally performed today. While approaches vary from automaker to automaker throughout the world there are really only two fundamental principles in common use for volume production. Welded Unibody construction is by far most prevalent, and is largely treated here, although the invention is not limited thereto.

Conventional High Volume Practice

In the first approach, shown in FIG. 1, the two parts should be, let us say, the side to the underbody of a car are to be assembled. The side of the car, 2, (called a Body Side) is positioned by locator block 7 and attached fixture 4 and clamped by clamp 3, against the member 5 of underbody 6, and against various front and rear members as well, typically. Only one member, a front cowl structural member 5, is shown here for clarity in a position to be assembled. While the side of the car is shown clamped at point "P" by clamp 3, it is actually held at perhaps as many as thirty locations depending on the situation. Points are held together with additional claps, such as those of FIGS. 2a and 2b, which are pneumatically actuated against the metal to keep it together so that the spot welds in between the clamping locations can be affected properly, for example by guns shown in FIG. 2b.

Dimension of the assembly is controlled by locator blocks such as with faces thereof and, in certain locations by pin means, such as a pin hole 10.

The side may be "tabbed" into the underbody to hold it temporary in place using for example tab 15 of side 2 and slot 16 of the underbody 6 (a process commonly called "toy tabbing"). On command a spot weld gun 20, (carried for example a robot: 21) comes in and pulls the metal together into contact and resistance welds it. Welds are often placed at specially provided metal flanges on the parts in question.

This mode of operation is used throughout the world and the major differences being whether or not fixed weld guns or robotically positionable weld guns such as 20 are utilized. Fixed guns have the advantage that they are fixed in (or swung into) one location and can not drift off (however, this often is not necessarily the case due to mechanical problems), and that numerous ones can weld simultaneously. However such mechanical fixtures are cumbersome and notoriously difficult to maintain due to interferences generated. They are also completely unreusable for other assemblies. In other words it is virtually impossible to build another body on the fixture with a large number of fixed guns.

After the point at which the structure is physically joined at key locations, the remaining welds on the structure are typically put in, in the case of the body-in-white with robots, and in the case of the sub-assemblies with fixed guns although many lower volume manufacturers in Europe, for example, also use robots here as well.

While shown here with implications for the assembly of the complete body from major subassembly components, such as the side frames, underbody, motor compartment, roof, etc., the same technique can also be used for each of these assemblies, which may have 15–50 individualized pieces. In subassembly welding, less robotics is often used than for the final body framing operation.

There are multiple problems with the conventional prior art assembly techniques as described above. First, it is very difficult to change from car line to car line: that is let us say from a Cadillac to a Saturn; because the fixed weld tools, such as locator block (also called an 'NC' Block) also including clamp—and gun 25 simply cannot be moved. One approach to at least allowing this to be done for similar styles has been the use of movable gates which are assemblages of such locators which can be changed en mass. However, there is still no mobility in most lines to change complete types of cars (car lines) either from job to job, after a shift, or even over a weekend.

FIGS. 2a and 2b

FIG. 2a further illustrates the function of locators and clamps. NC Block 7 whose surface center is located at cartesian point X,Y,Z, has a machined surface at angle $\theta$ (and other angles $\phi$ & $\gamma$ as needed), cut from a CAD model of the part, positions the part at the correct location. Clamping force F is required to offset the springback of the part(s).

In real life, the clamping force is supplied by pneumatic pressure, and in many cases claps distort the metal in whatever direction necessary in order to force the piece against the block face and against each other. In a sense one is actually re-bending the metal to accomodate the fact that it wasn't stamped correctly in the first place (or was distorted during shipment). In some cases, the part is located on a pin, to locate it in the plane against the metal. This can only be at one location on the part, let us say, because of the problem of inaccuracies of hole locations, typically.

FIG. 2b illustrates a typical spot weld gun 20, welding flanged metal parts 2 and 5 between 2 clamping locations 30 and 31. The gap W is closed by virtue of the clamping action of the pneumatically activated gun electrodes 35 and 36.

It is now desired to weld the two parts, who would have been so clamped together at discrete locations. Typically they are clamped together at multiple locations, along the length and height of the part. The larger the part, the more clamps and locators. In a typical situation, there is a flange between the two pieces of metal which acts at the point at which these spot welds are placed. The robot comes in as shown in FIG. 2B, located itself over the flange, and clamps the two together with the pinsors of the robot electrodes, and through a high average current, resistant welds the two pieces together in a "spot".

There are several problems that occur in this process. First of all, the robot location is uncertain (flange widths 'h' being large enough to addomodate some error), and if the robot is off location, during this process, the metal is pulled away from its proper position. This can have 2 kinds of effects; one it can distort the metal, and two it can cause the claps nearby to open, thereby creating a major error in "fit" of the body. Often times too, once a clamp is so opened up it can stay opened up for the whole welding of the body, since there maybe no intelligence to say that it has been opened (see also discussion below).

Robot location is uncertain because of the accuracy of the robot in 6° of freedom space holding the gun, which itself is heavy, and even if the robot per se was accurate, which it isn't, the gun weight in different orientations would be enough to throw it off.

Secondly however, there are problems with the fact that the metal itself has to be clamped together by the electrodes. In other words, if one tries to weld it without such clamping action, there would be no weld to curb, because of the air gap 'w' between the metal, in between the clamp zones. In other words the clamping is required to make a zero gap.

This is a major impediment to laser welding, which is a one sided weld process, not using two squeezing electrodes, and has inhibited the use of laser welds in industry. Today, in order to laser weld, for example, one virtually has to have "perfect" sheet metal, placed perfectly in the tools (a near impossibility), or one has to have the same kind of problem clamp location that replicates the robotic spot weld tools.

The invention, as will be described later, solves this problem through intelligent positioning of the metal.

Misposition of the robot can often cause the body metal to be pulled so hard as to break open one or more clamps, causing gross body distortion. Even minor errors can cause stresses, bending, and other problems.

Latest Trends—FIG. 3

A recent "brute force" technique to achieve flexibility of changeover between car lines, is shown in FIG. 3, in which robotic locator positioners are used, such as 100, which can position the individual locating NC block details such as 105—in three cartesian axes (x,y,z). A changer can be provided to change from one block to another for different car types since the locator blocks are cut at the proper angles to fit the curvature of the sheet metal at the point of contact. As many as 30 such positioners are used in a single cell of 3-5 cells needed to frame and 'respot' the complete body.

While flexible, this robotic positioner approach doesn't provide as many advantages as one would like. This is because:

1. It is complex, requiring perhaps 100 robotic positioning manipulators plus the welding robots, to frame the body.

2. One does not know exactly where the robots are since one has to rely on their own co-ordinate systems which may be off and can be damaged due to mechanical wear, handling, etc.

3. There is not absolute certainty that the correct locator blocks and clamps are present.

4. It is expensive—in capital cost, and maintenance.

Both this system (nicknamed "Geobox" by VW) and the conventional systems are increasingly using end of line 3D gages, such as those built by Diffracto or Perceptron companies to look at the car with light section and machine vision techniques at individual discrete positions and feed this data back to tooling or robot locations such that corrections can be made. Such feedback is required for the robotic systems but is not immediate, and only concerns a liked number of parts on the final body, not a myriad that may comprise the totality of dimensional determination.

Another major disadvantage of the above prior art systems is that they cannot guarantee that the individual metal locations between the clamping locations (or in many cases even at the clamping locations) are indeed fitted together; that is in physical contact such that a laser for example coming in from one side can weld them together. Without such contact, i.e. with a gap "W" as in FIG. 2b, the use of otherwise advantageous laser welding (which can be used to reduce the weight of the car through strengthened individual welds and is much more accurate) cannot be used. It is the intent of this invention to show systems that ensure such fit up and indeed maximize the value of laser systems for car body manufacture.

Another major problem, not apparent per se from the drawings of the conventional equipment, is that it takes a long time for these systems to be set up. Both because they physically locate the body at multiple points at once and are related to mechanical tool co-ordinates that have to be precisely set up mechanically. They also require a substantial amount of debug time, particularly with the conventional non robotic tools, the positions have to be changed often in order to keep the body together especially in the presence of dimensionally incorrect panels that do not fit properly (a "bad metal" condition).

In this case, in a conventional system, one rapidly loses touch with exactly where the locators are in space. Only that "wherever they are today, that's what makes the metal that we are getting today work". There is thus little or no intelligence that can be brought into the process since almost nothing is known about the actual physical locations of the locators. Only after the fact—at the end of the line, are the body gages utilized to determine the whole body dimensional fit complete with all the spot welds that have been put in. This is not necessarily indicative of what it takes to control the original welding operation used to establish the positions. This same argument on a smaller scale, also holds for the sub-assemblies (doors, sides, underbody motor compartments, etc).

Finally another disadvantage of prior art systems is that there is no commonality and no carry over from one part of the process to another, or from year to year, model to model, plant to plant. And there is no real economy of scale in capital cost, training or maintenance, nor is there direct "learning" between the construction of prototypes and the experience of building them, to the final high production build process.

GOALS OF THE INVENTION

The above characteristics of the prior art greatly limit the quality, flexibility, and timeliness of autobody and other part production. Accordingly:

1. It is a goal of this invention to provide systems which can serf inspect and feed back data in real time after or even during the individual joining operations. It is a further goal to optimize the build of the body via feed forward of data, best fit models, and other means, to create higher quality and reduce cumula errors.

2. It is a goal of the invention to provide assembly systems which provide quick accurate manual or automatic changeover between different models or assemblies.

3. It is a goal of the invention to show a common system which can be used all the way from prototypes to higher volume production with common tools, sensing, intelligence, and learning through the process.

4. It is a goal of the invention to provide systems which can be used to accurately join parts by sequentially rather than parallel clamping, and reducing the complexity and debug time of assembly structures.

5. It is a further goal of the invention to provide means for determining the position of the tools and for being able to relate the finished product quality to the tool locations.

6. It is a further goal of the invention to provide a untied system for assembly of sub assemblies, the complete body, and even the components to be added to it, such as doors, tail lights, wheels, batteries and the like.

7. It is a further goal of the invention is to provide a method of assuring fit up for laser welding, and other joining purposes, even in the presence of less than perfect components.

8. It is a further goal of the invention to provide a method for accurate assembly of tools, unibodies, and space frame vehicles, and other structures such as aircraft wings.

9. It is a further goal of the invention to illustrate means for dynamicall altering the dimension or location of Joining details of mating parts (eg. tabs and slots) as a function of dertmined or estimated dimension or location of the parts.

10. It is a still further goal of the invention to provide means for target datum application verification and data base storage.

11. It is an even further goal of the invention to show application of force control and optically based position knowledge to intelligently position, and if necessary deform sheet metal parts to fit in an overall assembly.

12. It is a goal of the invention to improve attachment of panels space frame vehicles, and the construction of the vehicle itself.

13. It is also a goal of the invention to provide means for learning from past assembly experience, including position and force data, to better control future assembly operations.

These and other desirable goals are achieved using the invention described in the following figures.

DESCRIPTION OF FIGURES ILLUSTRATING THE INVENTION

FIG. 1—detail of a conventional framing station weld system of the prior art as widely practised.

FIGS. 2a and 2b—Illustration of fixed and robotic clamping, locating and welding details in common practice and fit up problems which can occur between locator points.

FIG. 3a—a controllable positioning system of recent body framing prior art, illustrating however, In this example lay down sideframe assembly, and further illustrating certain control features of the present invention.

FIG. 3b Control System Block Diagram of a photogrammetric tool position system (PTPS).

FIG. 3c Detail of a Targeted Locator ('NC Block')

FIG. 3d An alternative tool targeting sheme.

FIG. 4a—A manual positioned tooling embodiment of the invention (RER). Also illustrated as an example is manually positioning the datums using a visual display.

FIG. 4a'—An enlarged plan view of the member depicted in FIG. 4a.

Figure 5A:
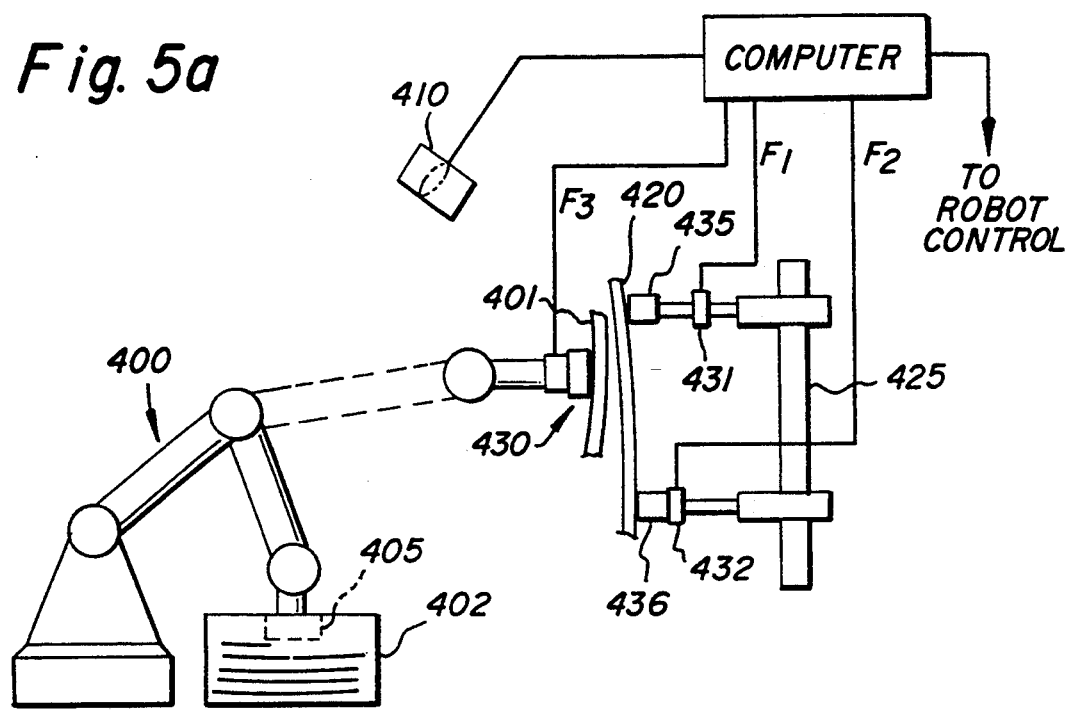
Figure 5B:
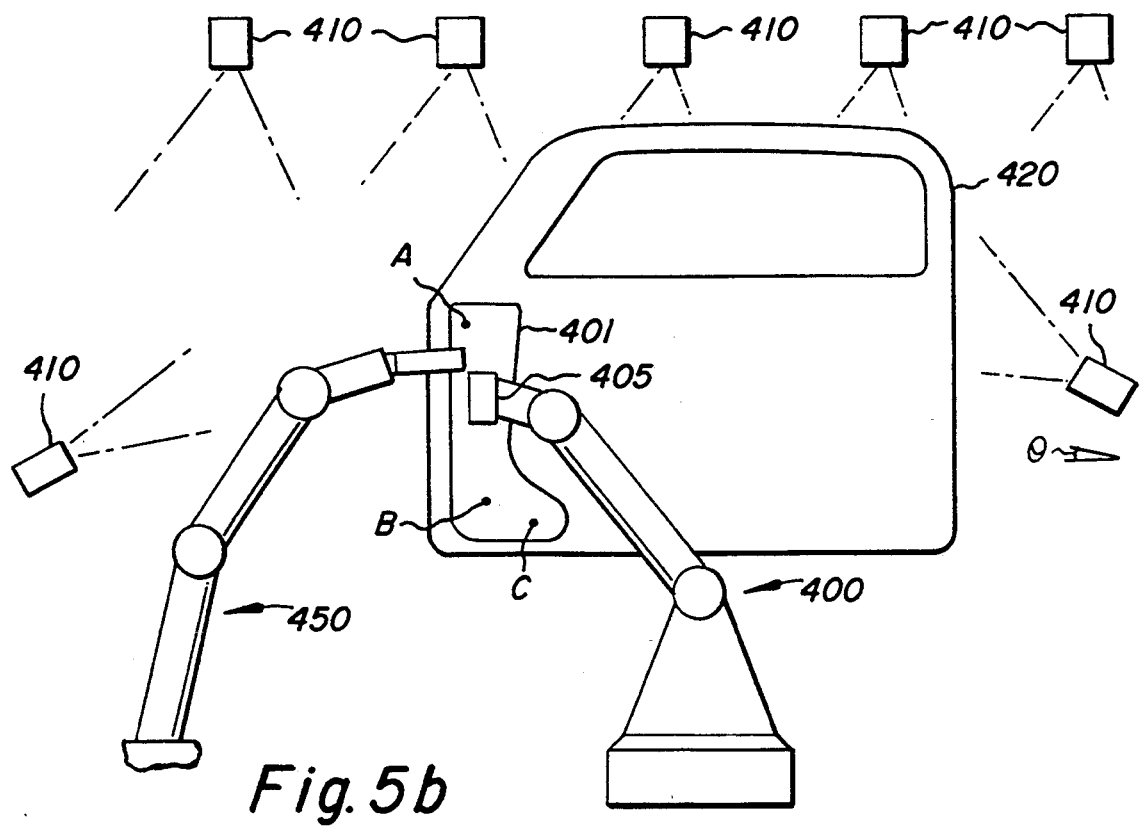

FIG. 5—illustrates a "fixture-less" automatic (or manual) assembly cell according to the invention, including force as well as optical sensing; and in particular components of the side frame of a car being assembled according to the invention FIG. 5b illustrates a detail of welding two components together in the previous embodiment.

Figure 5C:
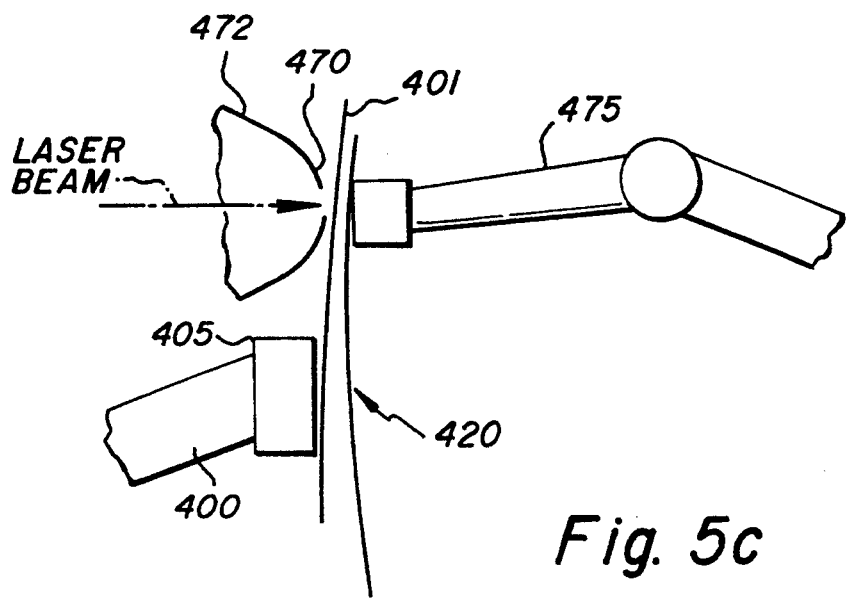

FIG. 5c illustrates a laser welding, 3 robot system.

Figure 5D:
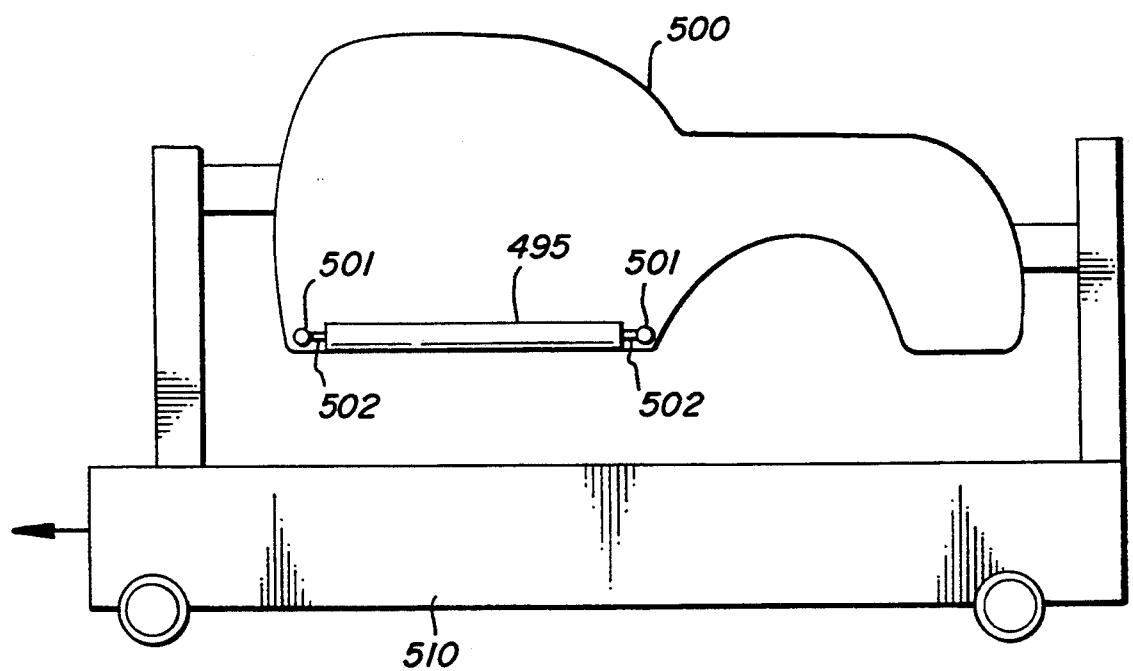

FIG. 5d illustrates an AGV mounted fixture with toy tabbed parts

FIG. 5e illustrates one embodiment of the marriage (framing) of the body major subassembles according to the invention.

A variation of the FIG. 5 embodiments uses the rapidly configurable positioning means of FIGS. 3 or 4. A robot tracking and positioning determining embodiment, is usable in instances when target or other datum locations on the part are obscured to sensors overhead or to the side of the work cell.

An embodiment is useful for assembly of outer panels to space frame vehicles, based on the embodiments of FIGS. 3–5.

Accuracy improvement is achieved according to the invention.

A process simulation is achieveable according to the invention as well as some of the intelligence aspects of sensing at the multiple points and positioning the parts to suit.

A laser trim/weld embodiment is used for 'intellgently' producing in components.

An additional embodiment achieves body build up in place using the invention. Employed one sequential 'clamping' and joining of motor compartment parts to the underbody, together with other joining aids to suit the immediate requirements of assembly of loosely positioned parts. The invention also a method of sequential body build employing a stage positioning system (such as an underbody positioning elevator, to maintain standoff of optical sensors, and other purposes).

An embodiment of the invention is used for assembly of trim components to the car.

The assurance of fit-up of laser welded (or other joined) components is achieved according to the invention.

An embodiment utilizes calibration of the other embodiments (when used with the camera or other measurement systems naturally in the cell, or with additional camera units).

Process simulation can be accomplished according to the invention

A door and a space frame component may be utilized with different target configurations, implementation schemes, and associated measuring, positioning and problems.

A precise location target application system impressed in a die of a inner body part, or target material injected in die ventholes (e.g. retroreflective or paint).

Also contemplated is a line projector, multi-camera embodiment of the invention and its operation with the target vision system.

The invention also includes application of the cell concept of FIG. 5 to aircraft manufacture including machining operations under photogrammetric guidance and control.

The first two embodiments basically describe the prior art principle of conventional sheet metal body assembly. While this invention is not related only to sheet metal body assembly, (commonly termed unibody construction), and indeed applies to space frame construction, and other types of bodies, it is the particular goal of this application to describe most applications sheet metal construction, since this represents the largest field of present car body manufacture.

These embodiments relate to systems which have been used to build both the finished body of the car and the sub-assemblies, such as doors, sides, underbody, etc. relating thereto. These systems generally have fixed locator positions for the resting of one piece; generally the largest, with claps that are brought into clamp the second mating piece, usually smaller, to it in an accurate manner, with accuracy generally derived from mechanical locations, such as with precision tooled NC blocks, gage pins, etc. A variant of this, is the use of optical rather than mechanical locations in this application that primarily differentiates this application from the present art relating to physical locator blocks and pins.

The embodiment of FIG. 3 describes a recent variant, pioneered in Europe and Japan, wherein the locator blocks are programmably positionable by 3 axis robotic arms. This allows flexibility, since otherwise change-over between one car type to the next can only be done by completely changing the physical mechanical tools either on a sliding fixture (Robogate), rotary fixture (Renault), or a total interchange of tooling sets typically called "gates". This physical/mechanical exchange has historically been very expensive, both to build in the first place, qualify, debug, diagnose, warehouse, etc. Clearly as the number of parts or different styles goes up in any one plant, as it needs to for maximum flexibility for the market, this tooling cost and complexity escalates almost expotentially in the effect on the plant, since the requirement for change exists at many different assembly and sub assembly locations given that several hundred sheet metal pieces of the car need to be joined together to make the unibody.

FIGS. 3a-d illustrates as well, the first embodiment of the invention, relating to the use of optical datums on the locator tool blocks to assure that the robotic positioners have properly located (or selected) the tool.

The invention is more directly illustrated in the FIGS. 4-8, which cover the principal embodiments of the invention: FIGS. 4a-f relates to the manual positioning of locators in Space, using an optical system much like that in FIG. 3, and deriving as well from my co-pending applications.

In FIG. 4, the invention illustrates a way of positioning conventional tooling in away that can be rapidly put in place and reconfigured. For this reason I have nicknamed it "RER", or Rapidly Erectable and Reconfigurable.

FIGS. 5a-e, on the other hand, illustrates the opposite case, where parts are not held precisely at all, and optically guided robots according to the invention, are utilized to position the parts, and to clap and weld them. This is fully flexible, one might call "fixtureless" approach, which, while complex represents the ultimate in flexibility, since software essentially defines the tool. It also is disclosed in manual and semiautomatic modes.

Also contemplated is the in between cases of FIGS. 4 and 5, where in the tool is configured either conventionally or reconfigurably to accurately hold and position one part, with the remaining part or parts positioned robotically. This can also be a combination of events, where a given tool can be rapidly configured at certain portions, say at one end of a long body side, but the another end might be robotically positioned. This embodiment thus discloses variations of FIGS. 5 and FIGS. 4 embodiments, which essentially combine the two concepts; that is of rapidly reconfiguring tools of the moreorless conventional type (FIGS. 4), and flexibly positioning pieces in correct juxtaposition, and absolute location for mating (FIGS. 5).

While the above embodiments are directed primarily toward the assembly of sheet metal panel into unibody assemblies and subassemblies. there is no limitation to same. Also contemplated is the case of assembly of structures which are comprised of more rigid components onto which it is desired to attach less rigid outer structure panels such as plastic fenders, etc.

Accuracy improvement of the total assembly location is achieved from multiple camera data fields, with a best fit location of the object, improving the accuracy by the amount required for accurate measurement. Also involved are certain aspects of the invention related to the intelligent operation of the systems.

The first of these is the ability to simulate the process. Since all positions are known within the accuracies of the optical systems, which themselves can be presimulated, one can simulate then, the total assembly of components in the vehicle. with the various accuracies that can be expected. Even if the metal is imperfect, one can adjust the system in order to achieve a certain desired level of accomodation, then one can actually simulate the system under conditions of less than perfect metal, etc.

Also disclosed are some of the intelligence methods of sensing and positioning the parts to accomodate the variation.

The remaining embodiments disclose extensions of the foregoing and, as well, elaborate on particular desirable aspects thereof.

For example, disclosed is a method according to the invention for intelligently assembling vehicles using the tab and slot approach, or other devices by which one part maybe loosely located onto another pan (e.g. snaps, interlocking hinges, ties. etc.). However, rather than pre-manufacturing the tabs and slots, or other interpart locating devices, and then assembling them after the fact, in this case, the tab and slot locations are at least in part manufactured on site, as a result of optical and/or force sensed data as to where the parts are located in space, or where other parts may fit into them, etc.; so that the location or configuration of the tabs and slots may be done in a manner which optimizes the build of the vehicle, in an intelligent manner.

A unique capable ability of the invention is to build up the body (or other assembly as desired) in place, bringing in each component one at a time for example, and adding it to the previous one; or by loosely configuring some of the components together, and then locking them down, and adding other components. This made possible because all locations are known (all or a substantial number of the locations) through the optical system of the invention, and the optimal build of the body, as it builds from let us say the fiat underbody of the vehicle, all the way to the completed vehicle. It can be done with everything known relative to each other.

This is quite different than today's practice, where sub-assemblies are built up, even in other factories, hundreds of miles away, and one really has no knowledge of the interrelationship of the dimensions of the various pieces. One only "hopes" that it goes together.

Also contemplated is the continuation of the process, not stopping at the body-in-white, but all of the way through to the addition of the trim components, such as batteries, tires, windshields, etc.; all from the same data base. This can be done directly with a space frame type vehicle, where pre-painted panels can be installed, or where it is necessary to take the body for paint and return it to an area where these dimensions are known, such dimensions built up on the body can be transferred to the second location (which also could be same location with the body returned from painting), and the build continued—shile preserving the same data base of all the components.

This is particularly interesting for internal components such as those that have to bolt to the various engine or interior features. Even though the locating holes for these components may now be covered up or obscured from the vision system, their data is known from the point from which they were viewed during their assembly.

Another aspect of the invention is the ability, by using intelligent force and position sensing, either/or, or preferably both, and one can assure the fit up of components; that is that they are in contact with each other at the time of joining. Quite clearly, if they are a loose assemblage of components, it only needs to be assured that it is in contact at the time that joining is done. This has been one of the major problems with laser welding, which otherwise has some desirable features for car body manufacturing, in that it cannot work unless total fit up is assured.

Another aspect of the invention is how to verify the sensor systems or tool positions.

This is not just a matter of verifying but also of callibrating the system, which in order to function may require substantial part location accuracies to be derived from the camera video data. In this particular embodiment this callibration is demonstrated by:

A) The use of targeted body metal (a 'silver body' of sorts), whether it is the whole car or sub-assembly, or whatever is of interest In the fixture or assembly operation in question, of known dimensional relationship. (For example, checked with a CMM.) This metal is then viewed by the target control system, and used to rezero and recalibrate the cameras at that location. This is an appropriate function of all the various embodiments.

B) The second method described illustrates the use of datums on the tool itself or in the work area, such as on the floor, walls, ceiling, etc to act as reference points for sensors which are either fixed in the work area, or at the end of a row of a robot, for example, or on the end of a tool.

Also contemplated is simulation of the photogrammetric positioning and assembly process.

Now turning to the subject of target datums, many of the embodiments rely on targets, either special or natural.

Also contemplated is both automotive side frame components (although it could have been even a door of a house being assembled for that matter), and an automotive space frame component, with different target configurations; such as retro-reflective dots, etc., laser engraved crosshairs or circles, and the like, and discusses some of the associated measuring and positioning problems which relate to these targets.

Clearly such targets, in many cases not normally present on the objects; especially outer panels of bodies, although inner panels are actually filled with potential target types, such as notches, holes, edges, etc. For those cases where additional target datums are desired, particularly on outer surfaces which must be smoothed, a precise target location system is contemplated which is unique to pressed and molded parts, and able to apply the target material to the part. Clearly template techniques can be used as well, which are similar in many respects, but require a separate operation.

Laser targetting is extremely interesting for those areas where a laser would naturally be employed, such as in the trim die area of the stamping, or perhaps for flash for mold on plastic.

Turning now to optical systems, one of the specialized optical systems, as used for the invention, is for projecting targets in a manner that is flexibly positionable wherever one needs it. Also contemplated is a system for moving these total sensory sub-systems back and forth within the cell, along an axial drive, to be effective at the point at which the immediate joining is taking place, and giving maximum accuracy there.

Finally, there is contemplated expansion of the application beyond cars to aircraft manufacture. In this case as well, it is illustrated that it is not just to guide assembly but also machining operations.

FIGS. 3a–d

The First Embodiment of the Invention

The first embodiment of the invention is shown in FIG. 3a. Photogrammetric camera systems 110/111, and associated computer system 120 observe and determine the location of the NC block locators in space, such as 105 and 106. These camera units have a field of view including the typical locator (or other tool) positions for the body styles to be made and are used to determine from sets of target datum points 107 and 108 located on one or more faces of the locators (see FIG. 3c), the X,Y,Z location of the locator in space. Each system at each particular operation can therefore either check that the robot has positioned the locator at the correct location or cause it to be positioned there by operating through the computer system 120 to drive the x,y,z axes, until the correct location of positioning robot 100 or 101 for the sideframe of the body style desired has been reached.

Figure 3B:
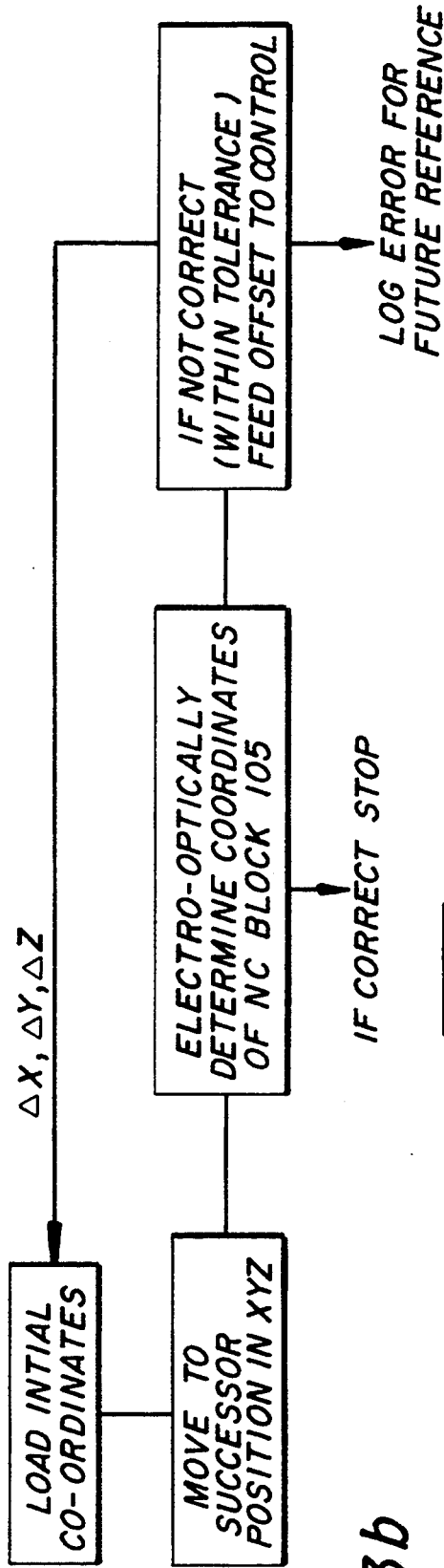

A control block diagram of FIG. 3b illustrates the sequence of actions.

By using this optically based, separate, external reference frame system, all body tooling coordinates are known independent of robotic manipulation problems. In addition, the presence of the proper tool is indicated by the target datums that are there. If the correct grouping of datums for example is not there to suit this particular photogrammetric situation than obviously the wrong locator or other tool has been used. Camera systems used are either single, dual or stereo pairs of TV cameras, one per tool as shown, single or stereo cameras with fields of view to cover more than one tool, or scanning system which can see each tool in sequence. Similar systems are disclosed in the referenced co-pending applications, and relative to further embodiments below. The dual camera option using additional systems 112 and 113 allow orthogonal or other angled views of the locator to increase accuracy in all three dimensions.

Required, is an unobstructed view of the tool targets when the robots extend to the vicinity of the desired locations. This means the cameras generally have to be at an angle to (i.e. above, to the side, etc), or behind the datum surface. In this latter case (now illustrated), the targets are located on the rear face of the block 105 (and viewed by camera(s) 110) using machined in dowel holes to locate the glass bead or cube comer targets 116-119 that are in relationship to the front surface 104 (all shown in FIG. 3c).

Alternative tool targeting schemes are to use retroreflective dots, made with retro-reflective tape at known spaces on the tool face (see FIG. 3d). Three such dots allow the face to be observed. The tool targets can be retro-reflectors or inserted retro-reflectors, painted dots, or any other datums which can be recognized and measured by the photogrametric system.

FIG. 3D illustrates a variation with manually (or automatically) positionable locators such as fiat plate 130, positionable in this case in 4-5 axes (rather than 3, as above) for example via manually adjustable ball joint 131 or automatically positionable robotic wrists, to allow universal positioning such that physical change of NC blocks is not required to change from radically different part shapes. In short it positions the locator block to the correct location in 3D Space using the control camera units such as 135 overhead. These camera units are masked by the side frame as is placed in, but it is assumed that the location is sufficient to do the job. If dynamic measurement is needed, tile cameras can be side mounted to view the locators even with the part in place.

FIGS. 4a-f

The preferred technology for sensing 3D position and attitude is photogrammetry (either single or dual camera), an example being the single camera real time photogrammetry system RPS described in references provided in my copending applications etc., and described in other referenced applications by the inventor.

In the next example however, rather than illustrate the automatic positioning using 5 degree of freedom positioners, it is interesting here to illustrate manual positioning. In other words, to allow let us say, between shifts, overnight, or over a weekend, the laydown sideframe fixture and all other relvant fixtures in the plant. Indeed it is contemplated that some combinations of automatic and manual positioning would be used with the manual ones to change the car line and the automatic ones to change styles for the relatively fewer points that are changed only between styles of a car. That is between a sedan and a hatchback, and a coupe for example.

This manual set up embodiment of the invention can be utilized both for construction of fixture tooling and its changeover. The invention allows such tooling to be erected in place very rapidly, "tuned" to early sheet metal condition, and to be later reconfigured as needed for example to change body styles overnight, say. Here again the rapid and accurate sensing embodiments of the inventions for determination of component location in 3D space are utilized. This has major advantage in cutting the cost and time of getting lines running and changed over. Rapid reconfiguration makes possible economic production of small volumes using more or less conventional part holding and joining.

FIG. 4 is thus a method according to the invention for the rapid and reconfigurable configuration of body framing/tooling. It is realized that this is useful for sub-assembly welding as well. (e.g. side frame, underbody, motor compartment, doors etc.)

The following is a description of procedures to set up the rapidly erectable fixture concept of the invention, in the simplest case, a car body plant capable of building one type of vehicle at a time. As will be later shown this is also capable of being changed over to other .types of car lines at will using the same technological equipment (hardware, software procedures etc.).

The system is desirably constructed of standard components which can be used (and re-used) in many factories and therefore need be designed but once. The preferred standard tools consist of tubing, ball Joints, locator blocks, braces and other structural members needed to support the holding devices for the inner and outer body panels which are typically sheet metal. While the design herein is particularly been concepted for use with laser welding devices it is also applicable to spot weld guns, although these exert substantially more forces on the structure and pose interference problems that make rapid erection and reconfiguration more difficult.

It is noted that the laser welding units can be in programable manipulators capable of addressing multiple spaced points on the car body or other structure being fabricated or, alternatively, can actually be built into individual holding points using fibre optics which can be used in a local area and the laser beam sequentially switched optically from one area to the next if desired.

Figure 4F:
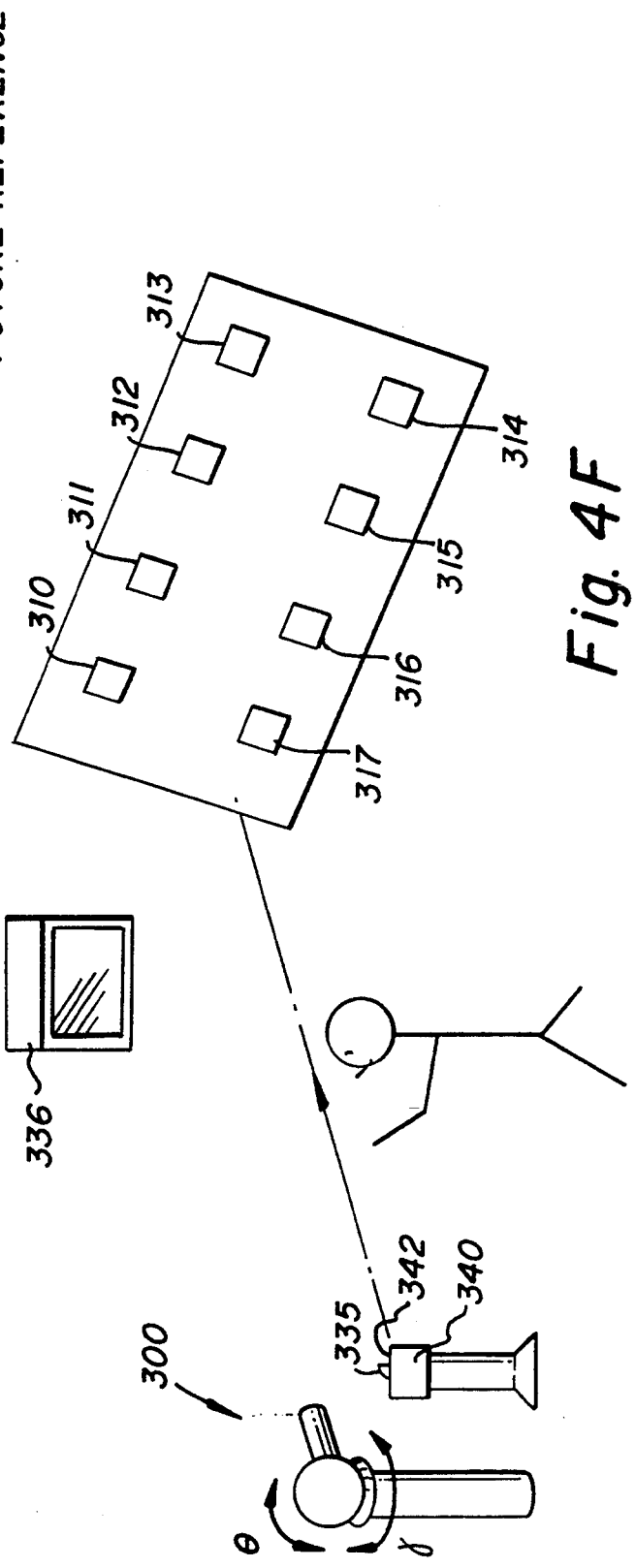
FIG. 4f illustrates an interferometic displacement based appartus for electrooptical determination of member position.
Figure 4G:
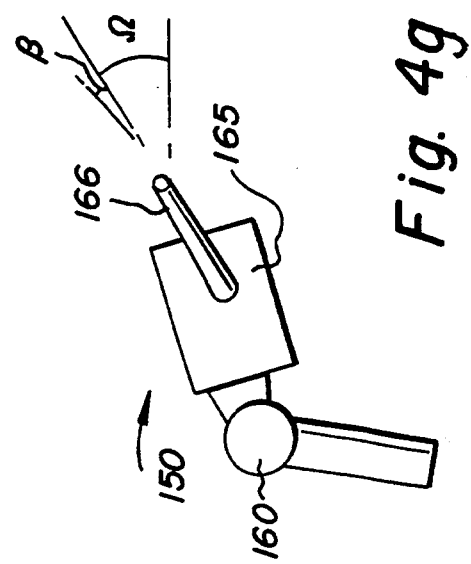
FIG. 4b illustrates 5 axis position of a new universal locator, rather than 3 axis NC block positioning.
FIG. 4c Illustrates electrooptical determination of member location via alternative scanning sensor units.
FIG. 4d and 4e illustrate a variation in the embodiment of FIG. 4a wherein cameras are located on tooling members.

We consider furnishing of equipment to a conventional plant, essentially begining with empty floor space. Standard frameworks such as 140, as shown first are provided to which are bolted the support members for the various sheet metal locating blocks. These support members are generally speaking not unusual but have certain possibilities that do not normally exist; namely that the members, such as 150, 151 and 152 are able to slide in and out in all 3 cartesian axes and be subsequently locked in the position desired. In addition, where desired, the ends of the tubes can also have ball joints such as 160 capable of positioning a machined plate such as a body locator surface 165 having pin 166 at a desired angular location $\beta$, $\Omega$. (Alternatively 3 axis positioning and machined NC locators, as in FIG. 3 above, can also be used via expanding cylinder 195 operated by hydraulic pressure P or ball cup 160 operated by fluid pressure P as shown in FIG. 4b.

In order to provide a structurally rigid support, tubing is selected of large enough size, capable of being locked down of either mechanically or as might be desirable, hydraulically. The hydraulic locking provides a very strong system that does not utilize a large amount of space and is also easily released partially or in total so that repositioning by the manual operators can be accomplished.

In order to position the locating devices at the correct locations the targeted datum points on the tool locators or other portions of the support member are viewed from overhead or from the sides and ends using the invention. As shown, camera systems such as 170–179 essentially lining up on both sides and/or overhead are utilized to locate the tools.

The camera units located down the sides are positioned particularly in the areas where the side frames (in this case) would be welded. For calibration, the sensors can be zeroed on a master plates located at the bottom or sides of the work area such as 180. In addition, or alternatively, a 3 dimensional calibration frame such as that shown in dotted lines can also be provided in the cell as required.

At this point the tooling locators are built up on the side fameworks or plates using the invention with the camera or other sensor units used to determine the ends of the locators which have been chosen for the particular job in question and can be pre machined. If all six degrees of freedom are required, the ball joints are capable of doing this being subsequentially locked hydraulically.

Each in turn is built up using the visual display 190 from the cameras that relates through the CAD data to that which the body should be.

The processor connected to the camera unit(s) or sensor overhead instructs the operator through the visual display screen to move the locator block position, "homing in" on the precise position of the locating details. When they are located he then clamps them down, preferably using a hydraulic system which he can slowly energize while still assuring that the datum points are matched as seen in his display. When the locator detail is actually positioned and locked down he then moves on to the next position. It is even possible to have an overhead indicator as to where the next position should be, such as a laser beam or equivalent pointing in rough manner at the area he should position the locator to. Two laser beams intersecting can be used together with theodolite cameras.

The tooling of the invention can, as has been noted above, be erected in place. Because of the precise dimensional set up possible with the camera or laser scanner sensor units overhead, (which can be calibrated using known photogrammatic techniques) it is not necessary to first dimensionally build this system in a build shop, then tear it down, send it to the plant and re-erect it. This is also made possible because of the relatively simplicity, and standard nature of the tooling (and works for camera calibration). (It can be targets like 180 for example sunk into the floor and/or rigid walls of the cell structure.)

To reconfigure the tooling for a different body all that is necessary is to simply lay out the new positions of the tools using the guidance system just as one did in the original effort, and reprogram the robotic welding (not shown)which we note can be also controlled by the same guidance system. Alternatively we can use the invention to position fixed guns as well.

Since the sensor unit(s) overhead can be used to check the position of the tools and robots, the risk in repositioning a tool to a new body is eliminated. One can indeed reposition it to within the accuracy of the system right back to where it was in the first place.

In terms of running of a line Like this there are several possibilities. First would be to change completely the car body style being made, let us say from a large car to a small one, over a weekend. To do this economically probably requires that the tooling be able to accommodate different style variants of any particular car line being run e.g. sedans, coupes, and wagons for example. However a large variation could be accomplished on a weekly changeover basis. The idea here is to keep the tooling in place at any one time as simple as possible, and not to require enormous hardened fixtures loaded with all kinds of interfering tools such as those used today.

Figure 4A:
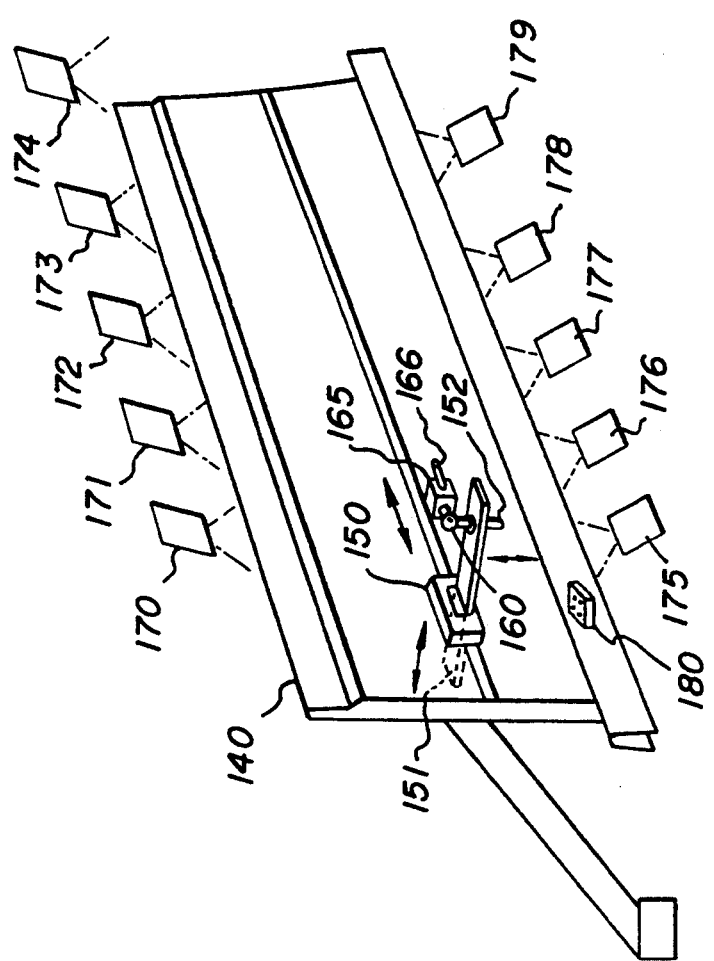
Figure 4B:
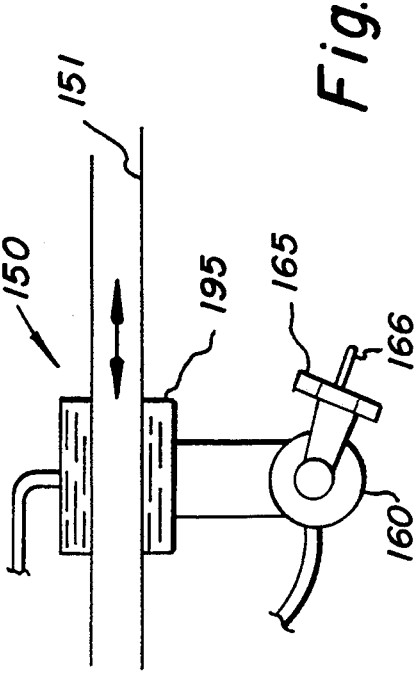
Figure 4C:
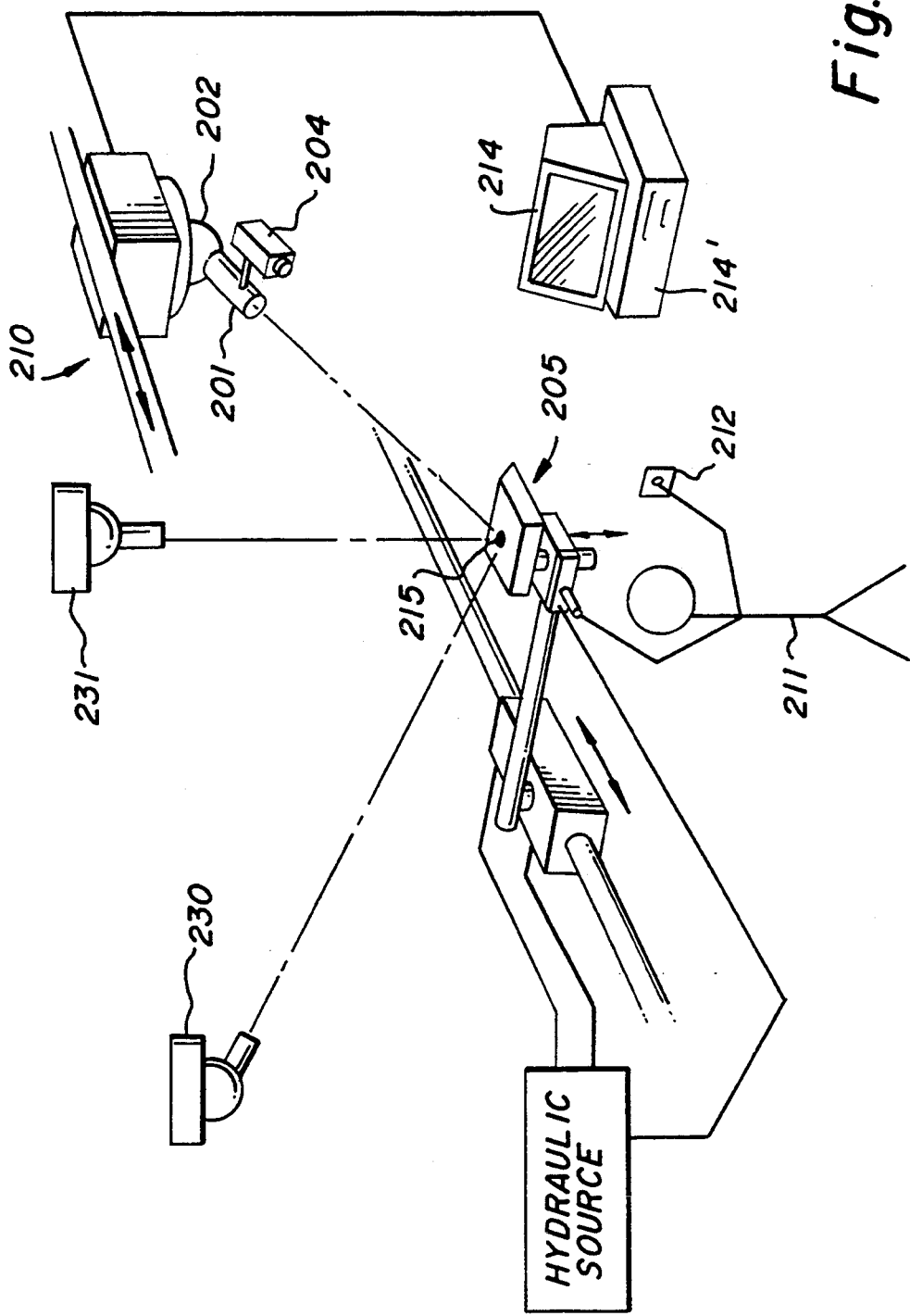

As further shown in FIG. 4c, an alternative sensor based system 210 located overhead (in this case) can be employed using a laser range finder 201 on a motorized gimbled Theodolite mount 202, further including TV camera 204 (usually bore sited) is utilized to site the target positions on the individual tooling 205 details as the operator 211 sufficient for x,y,z position moves them into the correct location, using display 214 with a computer 214'. While a single target retroreflector such as 215, three or more target datums per detail may be employed so as to allow an angular position $\beta,\Omega$) to be determined as well as cartesian co-ordinates X, Y or Z. Alternatively two (or more) different sensor units of type 210 (or mixed between type 210 and cameras 170–179) can look at the same detail at once, to improve accuracy and prevent occlusions. Use of small retroreflector targets (optional)on the tooling details allows easy sighting by the camera system and provide accurate ranging.

When the operator has positioned the tool detail in place a hydraulic, manual or other locking device 212 can be used according to the present invention to secure a locating/clamping detail. It is noted that these particular positioners can optionally be motorized in any or all of the axes if desirable, and the operation automatically under performed direct sensor adaptive control. Or via incremental motion, one can say to simply advance six step. (Each step being 0.05 mm in a cartesian direction using a step motor and ball screw. Carrying this to the limit is the robotic embodiment of FIG. 3a.)

Particularly difficult to automate is the rotational positioning, which is accomplished easily herein by a locking ball Joint as shown, where a hydraulic clamping pressure holds the ball locked. One does not see in normal practise, 5–6 axis adjustable positioning tools because of the problem of setting them up in all axes but with the invention this becomes easy. This relieves the requirement in many cases of having precision machined NC blocks, and is particularly useful for prototype work where such blocks would not be easily obtained.

A suitable laser range finding device is an electronic distance measuring unit provided by Perceptron Model 5000 or Digital Optronics type having a resolution of 00.1" in range with a desired accuracy of 0.008" (0.2 mm). (See data sheet.)

Alternatively servo driven Gimbal mounted automatic theodolite camera units, such as 230 and 231, can be used to determine the target location by triangulation. This system is similar to the Wild Leitz Kern "ATM" except that ideally 3 or more target datums are be seen at once to give immediate angular data of the locator face, as well a 3D cartesian location. As shown in FIG. 4c, these units (or for that matter a nest of cameras as in 170–179) cam in this case optionally shown, be on a slide to traverse the cell to known location axially or vertically, or in other directions).

In many cases where machined contoured locator surface ("NC Blocks") can be made, it is not necessary to position the locator surface angularly since a correctly angled surface can be machined into the locator from the knowledge of the data of the part. In this case a 3 cartesian axis locking positioner may be used (X, Y, Z). Also only a single data point (e.g. retro-reflected) on a tool block is required in this case (rather than 3 or more where angle is desired).

The photogrametric tool positioning system operates as follows:

1. The target tool is positioned in a rough approximation of its final location by the operator using the adjustable slide, and if desired if contour machine blocks are not used, the ball joint. The indication of rough location can optionally be provided, either by locating a prototype vehicle of the approximate dimension in the cell, or as a "master" or in this case "near master", or conversely can be accomplished by pointing at the correct location by any number of means. The first for example using laser direction pointers guided from above the cell, could point at an approximate tool position located at the point of intersecting beams, for example. These would be driven by the control computer, that has the knowledge of where the tool should be.

A second method of indicating rough position is to have a reference robotic system in the work cell which would position a reference surface in an approximate location for the human to reposition. It is noted that the goal of this complete exercise is to establish the very accurate tool locations in 3-D or 4°–6° of freedom space is desired, and that such robotic positioners by themselves are intrinsically not accurate enough by a factor of approximately 10 times (in the 6 degree of freedom case)

When the operator has placed a tool in an approximate location, the tool is viewed with one or more of the photogrametric systems. For the moment we will discuss the situation where a group of camera units is located overhead, and where one or two of which, in general, can be used to sense any one tool in itself. While overhead is shown, these cameras could be at the side of the cell, or one at the side, one at the top, used in conjunction which gives more accuracy; for example in one plane (illustrated in FIG. 5b).

The camera units view the target datums on the tool block for any other reference surface related to the actual locating surface for the part. The targets can be located typically not on the working surface, although they can be in a recessed manner. But are typically located on a surface visible from the sides, top, or rear, which can also be viewed when the part is In location, at least for those systems where the camera system is a permanent part of the fixture. This allows the tool location to be monitored continuously through the assembly run, and any deviations or other problems that might occur noted, such as distortion due to clamps, and the like.

The camera control system determines the position of the target datums on the tool and using known photogrammetric principles on 3 or more datum points, in any one view from one camera, or views from different cameras, determines the actual position of tile block, and compares this in the comparator portion of the program to the actual position at which is desired. An offset correction in as many degrees of freedom is required, is provided then to the operator display (or in an automatic system to an automatic positioner, see below), which then indicates the direction that the operator should move in, and the magnitude if desired of the movement required to get the tool block into the correct location. The operator then moves this tool block, either by sliding and turning manually the various pieces of the tool, or precise adjustment using micrometers or other positioning means, or in the simplest case just using shims, particularly those of known size, until the actual final position is reached, or until he is very near the final position, as to where a small deviation can be adjusted for, by loosening the pressure on the tool and slightly moving it, relocking it, then when the final position is reached.

Where one does not move the tool to its final position, but to one with an error in any one or more variables. The control computer calculates what this error is, compares it to errors of other tools which has already been positioned, and determines if the error is sufficiently low such that given the other locations in question, and their errors, that it can be tolerated; if so the operator can stop there, otherwise he has to proceed to ever finer locational tolerances.

It is also contemplated that a standard set of NC blocks, let us say with the most major angle, that is in the vertical plane, with respect to the horizontal cross car axis, would be generated with the other two angles adjusted manually, as shown with the ball. This thing can allow it to be done, not with a ball joint, but a U type joint on a swivel.

For use in controlling automatic positioners, such as shown in FIG. 3a, in 3 or more axes, the control system can function in a more simple manner. For example the automatic positioner positions the part in what it feels is correct location for that NC block. This then is observed by one or mores aspects of the photogrametric camera system; and an error signal if any generated, which is then fed to the appropriate manipulators to re-position a block. The new re-positioned block is then looked at again, and any further error determined, and so on the process is reiterated until the resulting positional error in whatever axes are desired is under some set limit.

One can also position parts in the same manner, by observing the tool that holds the pan, such as tile robot in FIG. 3a or by manually, or automatically causing the tool position to be moved to re-position the part in the desired location. Where one looks at the part directly as in FIG. 5a below, one can also go through the same control sequence. It is generally speaking more difficult to look at the part images(and datum points thereon) for such positions, and the error bands may have to be a bit larger than when actually positioning the tools, such as NC blocks.

FIG. 4c also illustrates the possibility of various novel displays for 3D operator interaction. There are numerous displays which can be used to indicate to a manual operator, how he should make the move to position the tool, or the part in the correct location for assembly. They range from a bar chart type display of up to 6° of freedom, where the zero offsets of each bar, and the rate of movement of the bars with each of the variables is set by the photogrammetric co-ordinate system computer, such that a particularly easy to obtain situation like all the bars lined up in a row on a fiducial mark is shown in the figure is obtained when the part or tool is in the correct location.

This is shown in FIG. 4c where the operator looks after the display, determines that, let us say, one variable, such as angle, needs to be positioned, moves that part or tool in that angle, at the same time influencing some of the other variables, and Jockeying the part around in position until all variables are known to within some bandwidth around the target.

A second type of display is a gun sight type display, in which will not be elaborated in here, but has been used on the Canadian Space Program in which the part or tool is moved in such a manner as to cause a gun sight reticle to home in on a cross hair, while displaying certain paralla in the X to indicate the angular relationships other than roll, and rotation for roll.

Beyond these relatively simple displays, there are more sophisticated displays which can be used to present to the operator. One of these is to use the control computer to generate a 3-D CAD type, even colour type representation of the tool or part position, and where another part is involved the mating part position as well. The operator then homes these in on each other, simply by watching the display, and when they get close the shading of the display, which when it goes to a uniform shade, or colour in any one direction indicates that the part is correctly positioned.

Figure 4D:
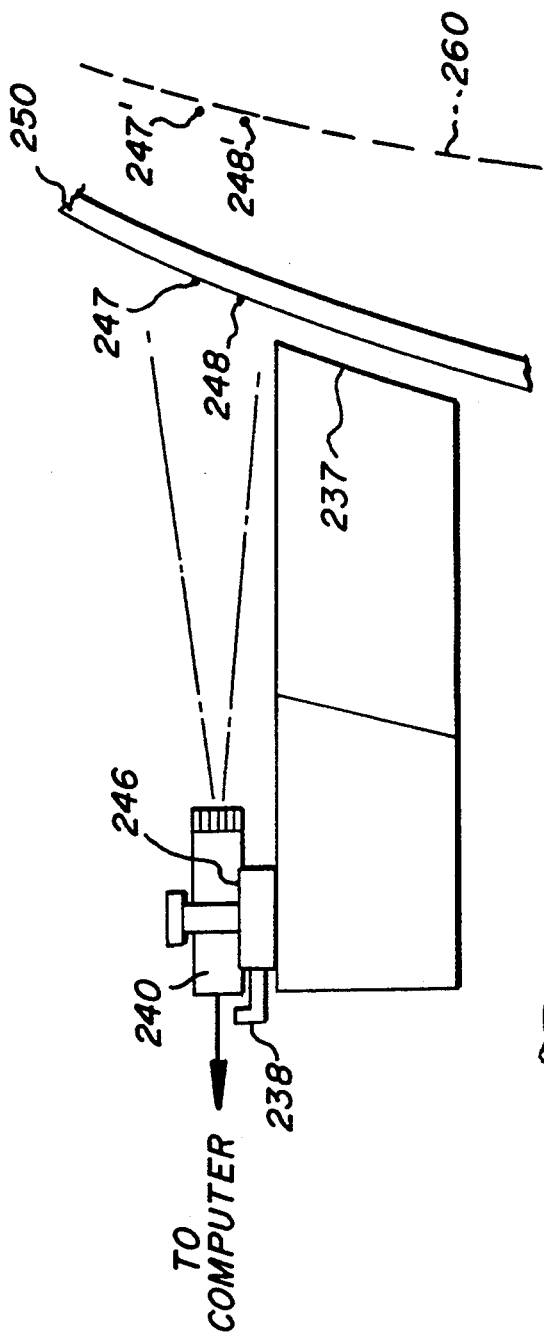

Shown in FIG. 4d, is the use of a different form of set up procedure for fixture tools; that is to locate the locator blocks and any associated clamps or the like that go along with it, using optical datums on a master object (heretofore I have disclosed positioning generated from datums being located on the tool and being looked at from overhead with either fixed or moveable camera systems, or other optical ranging type devices).

In this case, we have shown a somewhat reversed situation, in which a miniature TV camera 240 is located in a known relationship, to the tool locator surface 237 itself (e.g. clamped in a miniature V block 246). The camera can be left in this position or removed and put on another locator to set it up, in any case it is fixed in position by action of the V's on its cylindrical body relative to center line, and its axial location, due to stop 238.

As shown, the operator looks at the visual display such as 214, which in this case also gives a direct TV (grey level) image as seen by the camera, as well as any target co-ordinates of the object which in this case is targets, such as 247 and 248, or other features on a master component 250 (measured "silver body") or alternative target master plate 260 (dotted lines brought in for set up purpose). This target plate can be a flat plate with a plurality of targets observable by a plurality, of tool cameras or a known positionable plate using robotic positioners, or any known targeted geometric body.

The operator aims the tool and camera combination, after having loosened up on any previous fixing of the tool, until the target datums in question are in the field of view. Then using instructions on the TV display, which have been discussed relative to FIG. 4a, such as bar graphs, gun sights, or 3-D model displays, he proceeds to move the tool until it is in the correct juxtaposition with respect to the target datum master. When the computer indicates through the medium of the display or otherwise that it is, he then locks it down, and proceeds to the next item.

While the cameras can be removed, the cost of cameras in relation to the total operation is relatively low today (under $1,000 in quantifies), and will likely be even less in the future.

Using specially marked target datums on the 'silver' body 250, which can be layed out on CMM's, etc, and put on with retro-reflective material or otherwise, the camera systems can be used to look essentially past the tool at the body, and set the tool essentially from the perfectly measured body condition.

In the FIG. 4d example, leaving the cameras in place on the tool has several advantages:

1. You can track any movements in time and determine if corrective action is needed, by mastering the system periodically.

2. The errors are not introduced by positioning and re-positioning the cameras. The set up today is exactly the same as it was on the last time this particular job was run, within the air band of the human positioning in the display.

3. One can also use this to troubleshoot and to double check the situation.

4. If the field of view is large enough, the cameras can look at a master body component, for example, not just a tool setting target in order to assure position.

Figure 4E:
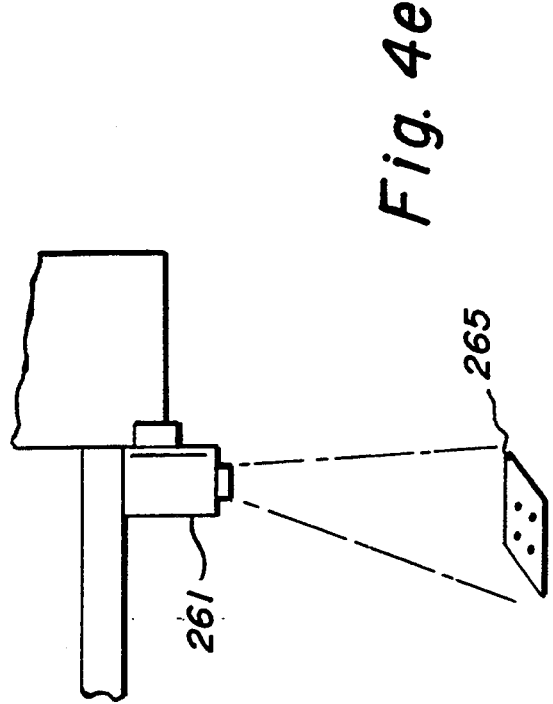

There are numerous places in which this can be used, for example, a camera 261 shown in FIG. 4e, points in the correct position to look directly at the floor, in which the target plate 265 has been located, which acts as the master for that tool. The target plate may have multiple target datums, different ones for which are used for different car bodies, but any group of three or four known targets can provide as previously disclosed a single camera photogrammetric solution in X,Y,Z roll, pitch, and yaw of the camera to the position of the tool.

Alternatively or additionally, the target datums may be located across the work cell on some reference plate, or on a reference plate, or other geometric member that is brought into the work cell for the purpose of set up and mastering, as described relative to FIGS. 4a-4c above.

The above figures have all illustrated means for determining the position of the "tooling" used to locate parts to be assembled. This is desirable in every case where the tooling can be observed, and is also often necessary where one cannot see the part, i.e. to look at the tooling and from the tooling know the position of the part with respect to the tooling (assuming they are correctly in contact).

In addition, all tools have been shown with special target datums, to aid optical determination of their position in 3D space.

In the following embodiments, it is desired to illustrate sensing of the parts themselves which, after all, is the finished product and the one in which feedback is then made either manually or electronically through software to positioning means to locate the parts so that they are located in proper 3D space and properly with respect to one another.

Some, or for that matter all of the positions to which the operator places the locating details in FIG. 4c can be optionally automatically positioned by appropriate servo motors if desired. Naturally if this is done completely it really resembles the prior art of FIG. 3a. However this is very costly. There could be some details however that could be best done automatically, for example those which are required to be repositioned often. One of which would be the change from a coupe to a sedan on any one car as this could almost occur job to job for certain special portions. The other would be those areas which were difficult to get at for the operators.

FIG. 4f

A different form of guidance than using fixed cameras is to use a ranging device moveable in angle. Such device are commonly known as theodolites, and recently has become conventional to use laser range finders with these theodolites. Some laser range finders, such as the Kern Micrometer have resolutions in the 0.1 mm area, that could be used for such tasks if suitably improved; thereby giving a colour co-ordinate indication of where a point in space is.

Another such device is shown in FIG. 4f. This is the Kern Smart 310 system 300, which is a high speed pointing angle device with a laser interferometer ranging unit. This interferometer gives extremely high displacement measurement precision in the radial direction, but must be tracked in angle from a known home position, as is commonly known in the art.

The basic method for utilizing this system in this application is to track a target retroreflector from point A to each of the sequential locator points such as 310–317 on the fixture to check their location. However, in this invention, we wish not just to check it's location but to physically move the retroreflector such as 335 until the operator display 336 shows that it is in the correct location. For this reason the laser retroreflector is positioned at the end point of the tool in a special mount 340; that is a known distance from the retroreflector surface 342. This mount then is moved around in space, tracked by the system, until it is in the correct 3 dimensional location. At that point the retroreflector is taken out and the correct NC block surface with this position on it is placed thereon. To check it, the retroreflector contact point can be touched to different parts of the NC block if desired, to check that the correct block has been placed in and is located correctly. However, this is seldom necessary if care is taken in selection and precision of manufacture of the blocks. The operator then takes the retroreflector and goes to the next, and so forth until all of the points are set up.

When changeover comes, to change over to a different body, the process is repeated with the operator sequentially placing them in the new position and selecting new blocks as required to fit the body (or subassembly thereof) now to be produced.

FIGS. 5a–c

Illustrated is a flexible assembly cell for automatic assembly of door frame and quarter panel, inner and outer, sections of the car body side. It is also capable of joining these sections together, and with additional components so as form the body side.

In the embodiment of FIG. 5a, the robot 400 picks the part 401, in this case the doorframe inner out of the parts bin 402, where they are stacked one on top of each other. The picking operation in this case is done as flexibly as possible, with a universal tool containing, as shown in this case, an electro-magnet 405. The magnet is energized and the part is pulled from its bin, and presently briefly to the optical system 410 (which may include many more cameras than the one shown to view multiple parts on all objects assembled and the robot and tools as desired) by the robot. (This is an optional step which depends on the relative unknown nature of where the parts lie in the bin. If this is required, it may be necessary to have a camera on the robot.)

In the second step, the part is then placed onto a door frame outer 420 held arbitrarly in the fixture 425, by tools 435 and 436 (and others not shown for clarity). The position of the first part (in this case the door frame) has been already determined by the optical system and the robot co-ordinates adjusted accordingly to position the second part 401 in the correct location. At this point the part is correctly positioned but not necessarily in contact at all points. What is key here, is to place it so that the electro-optical system as well as the force monitoring system 430 and optically such as 431, 432 on fixture locators 435 and 436 can determine that the point to be first welded is in contact, or near contact. This is to be done by varying the position of the end effector 405 slightly so as to cause the part 401 to tilt toward that particular point 'A', and as well to observe it with the optical camera systems as shown in FIG. 5b. When it is in the approximate position a second robot 450 is directed to come in and put a spot weld (laser weld, etc. or whatever) on to weld these two parts together. If the spot weld gun is used, this gun is capable of clamping the part at this location which further brings them together.

After the part has now been welded at one point 'A', the robot 400 can release the magnetic holding force, and do one of at least two fixings. First, go to another point on the part such as B and re-magnetize the tool force in order to better support 401 while pushing it against the part on another location such as C or secondly without energyzing the magnet simply use the end effector of the robot to push the part against another at another location where the robot again claps the part, and the process repeats all over until the proper number of spot welds are in the part.

Quite clearly, there are possibilites where part 401 is not really well proportioned, and cannot fit well into part 420. In this case a best fit analysis has to be made, and 401's location chosen to minimize positional error and assure that excessive force is not required at any one location, for example such that the pressure of the spot weld gun clamp can't pull the metal together or even if it was able to do that, that the distortion of the assembly would cause problems (e.g. leaky door seals, body fit). This ability to best fit the components to be joined, and thus allow the joining to take place with minimal distortion is a unique capability of the invention.

Where one part is fixed as shown, the only real relationship it has, as far as the equations best fit situation, is to assure that the fixed part Itself does not distort as the other part Is pushed Into it, such that It causes error. Positions therefore of the fixed part can be monitored with an optical sensor sub-system to see if everything is okay, and that the distortion is within known or controlled bounds.

Generally speaking, one would weld one side of the part at a point, typically in a corner, and then move to the farthest opposite side, and weld the corner there. And once those points had all been determined, then work backward to essentially finish off the welds.

It is important that we can during this process, watch the deflection of both parts through the optical sensor system, and determine if the welding is causing distortions that might have to be made up by slightly altering the location of the welds in any direction required.

In those cases where one has made the best fit, geometric positioning of the part into the hole, and it still appears that the tolerances are too great for adequate assembly, one simply removes this part and goes and gels another one, since that part may have been deformed etc, during transit. If two or three sequential parts are also deformed a sensor system calibration may be required, or one may have to go through an alternate stack of parts from a preceding day, that were known to work, and use those until replacement parts can be found, due to a bad batch.

It could very well be, that the largest part, in this case the door frame itself is out of tolerance. If this is true, the operation clearly should be aborted at that point and a new part found before any further weld operations are attempted. For this reason therefore, the sensor system can check the part and determine If it is okay.

In order to accurately determine the dimensions of any of the parts, multiple camera views and high resolution measurements of individual details on the parts are required. This is obtained in the preferred embodiment of the invention by taking a large number of data points on the part, and determining therefrom characteristic features that allow a best fit model of the part to be created, which can be moved in the computer to then find the best fit into the mating area of the other part. There are many unusable functions that can be done with this system. One is that pre-punched holes, let us say, in both mating parts can actually be aligned.

It is important to note to that the position of the welding robot, as well as the holding robot, are monitored during the process of actually welding. Since we do not have a rigid clamping situation between the two parts, that is one only held with the robot against the other, there is a distinct possibility for a rotation or a translation in any axis, due to the pulling that might occur from the weld gun. (It is for this reason to that laser welding is preferrable in many ways, due to non-contact nature of it, and even if an auxiliary clamp is used, it does not require still the heavy weight at the end of the robot, which tends to make robot positioning difficult.

However, because we have control over the positioning of the robots in a dynamic manner from the sensory data, even if the weld gun begins to drop and with it attempt to pull the part down, for example. We can energize both robots to re-position the part and the gun in order to accomodate this. When the positioning is correct, the clamping process can begin which tends to also stabilize the part.

When we go to make the second weld and again the robot spot weld gun can be controlled in its location to assure that it does not begin to distort the parts or attempt to pull the first weld open or whatever. The monitoring of these robot locations is accurately done with target datums on the robot end effector which would be as near to the weld held as possible in this case, yet still visible from the sensor locations.

For one sided positioning and welding, using a laser, one might wish to use an arrangement shown in FIG. 5c. In this case, the 'nose' 470 on the laser robot weld head 472 pushes the part 401 against the other part 420, with a third robot 475, being used to assist in this effort, and for those cases where the back side is reachable, possibly as well pushing from the other side in a coordinated motion.

In this case, the weld is scanned by a motor driven unit, which scans, let us say, a fiber optic weld laser beam across the weld area in the plane out of the paper.

Quite clearly in order to force part 401 against part 420, some degree of deflection of of part 420 may be required. In this case the optical sub-systems serve to monitor this deflection, and assure that not only that it is within known elastic limits, and that any deformation is accountable in the dimensional position, but also that alter welding and forces let off by the robots that it springs back to it predicted location.

FIG. 5d

It is also of interest to consider the possibility that the parts instead of being singularly picked up by a robot and placed in place, wither singularly onto a fixed second part, or both parts picked up and mated together, might rather be tabbed into place by a human operator. For example, consider FIG. 5d, in which part 495 and the rear quarter panel outer 500 are tabbed together, using holes 501 and tabs 502 as shown and the loose assembly brought into the work cell of FIG. 5. In this case the work cell simply robotically positions the parts in correct dimensional juxtaposition for welding, much as has been described above, without the requirement for actually positioning them in the first place into rough position, i.e. from a 6 in. etc. the final guidance issues however, are almost identical, and some of the force considerations etc. as well. It does however, make a very handy way in which to set the parts systems up logistically, in which case cells can be loaded by operators, multiple parts at a time, onto one fixtre, and the fixture then taken to a welding area, let us say on an AGV 510. This is exactly what has been shown in FIG. 5d a where the whole fixture is located on an AGV, which is then taken to the welding area; rather than having the parts having to be taken to the welding area singularly as in the case of FIG. 5a–c.

One interesting case of an AGV location is where the underbody components is first placed on a platen on an AGV, and welded up accordingly with all the rest of the system built up from there. This is illustrated as well in FIG. 5e. From a logistic point of view, this may be required since it then takes the assembly system to the parts. This is practical in this case, because there is no real need for any tooling considerations relative to the fact that the system is moved. The cameras in each of the cells are able to accomodate this.

Shown in FIG. 5e is a large scale "assembly cell" which is universal: that is it can be used for the assembly of many of the pieces of the car or for that matter potentially other objects such as aircraft, tail sections, wings, car and truck parts, and the like.

Another embodiment of the invention is utilized for the assembly of the complete car body (called a flaming or "marriage" station in normal parlance). In this case the pre-assembled side frames of the body are placed on multiaxis motorized holding devices and positioned manually by an operator looking at a screen so as to be correct in 6 degrees of freedom and in particular the three X,Y,Z axes as seen by the sensor system, for illustration provided by a laser range finder on a precision Theodolite mount automatically positionable to direct the range laser at any datum either using a pre program or by operator designation. The sides can move in and out, back and forth, fore and aft, up and down, under movement of the motor driven screws.

When the two side frames are the specified distance apart as distinguished from the target datums on the side frame and read by cameras overhead, they are welded to the underbody by a laser for example. The roof cross rails are then placed in position on the L-shaped shelves by the operator. Roof rail targets are also read by the sensor system and displayed to the operator as coordinate datums for positioning so he can move the rails (or the side flames) until they are correctly in place in the fore and aft position. At this point the operator moves back to press two palm buttons and the laser welding unit comes in to weld the roof rail using the co-ordinate datums previously read. As before, the laser head may also be targeted, to allow correct laser to weld joint position.

Note that the operator first positions the parts crudely and either manually or automatically aligns them angularly fore and aft, up and down, using the target data.

These holding fixtures can use a ball joints and/or slides which can be hydraulically locked when in position. This will be described further below. Similarly the robot joints can be locked as needed.

Where a camera or sensor system used to create the coordinate dam, it is located both overhead and along the sides (and front or rear) of the body framing station. Generally speaking, the operator can stand out of the way of whatever sufficient number of cameras it takes to see the parts in question. Since cameras are relatively inexpensive, a large number of cameras can be easily placed in a coordinate reference grid without relying on too high a resolution from any one. As an alterative to cameras, a 3D laser range finder or any other suitable 3D measuring device can be used as shown.

In either case specially located retroreflective targets are ideal. Particularly where cameras are used, individual holes, edges and comers of these parts can also be used as targets. Neural net techniques can be used to rapidly find the edges of the parts and other features which allow their position to be predicted and fed to the computer system. In many cases a combination of part features and targets or other designators are utilized.

At this point the primary goal of the sensor cameras located overhead and to the side shown are to sense datums on the side frames and cause the positioning of the sides to be optimized so that the sides are parallel and at least at a nominal distance apart.

After the cross pieces are dropped in the FIG. 5a–c example, a laser welding head comes in either from overhead in a gantry arrangement or if desired from the side or end utilizing an articulated arm.

While some laser welding units can come in from the side and can weld lower pieces even after the top rafts are in place it is often easier to have a gantry system where the lower welds are done first and then the top last. The supports in the rear and front are also put in, in the same manner.

As an alternate to manual positioning, a roof cross raft can be positioned by a robot holding it so as to contact each side frame. Contact can be desirably sensed in the context of the physical position of the mating pieces, and forces can be sensed using feedback, also to assure contact.

The welding robot as well can be controlled from its sensed location, so it may rapidly and efficiently get to the point at which the welding is to take place. This is not only helpful from the assurance of quality point of view, but also we realize that the position can vary from side to side due to the optimal control that might be adaptively entered to account for varying bend and twist in the side frames and other parts. In other words, we may not always cause the parts to be welded at a fixed side-to-side location. Indeed the side-to-side location of the cross members could move within certain tolerances so as to keep the sides parallel through an optimizing program.

For utmost accuracy of body build, it is desirable that the robots holding the parts be positioned to ±0.05 mm (0.002"), and the parts themselves to say 0.2 mm. This can be accomplished adaptively using inputs from either the camera system or tracking laser and range finder of the invention (or any other suitable means). Sensing of target datum location for example to 1/10,000 FOV or better is possible using a single camera, and sub pixel image processing techniques. Thus with 0.05 mm resolution a single camera could have a 0.5 meter square field of view. Helpful, is to view a target or other datum from more than one camera, increasing resolution in the range axis perpendicular to that of tile camera, because of the included angle between cameras.

Because certain datums may be small, this creates problems in sub pixel resolution. For example, in the above example, a single pixel occupies 1 mm × 1 mm in the object plane. A 10 mm diameter hole would encompass 100 pixel, yielding a sufficient chance for sub pixel performance. But what about other datums such as laser cross hairs? These could be as small or smaller than a few pixels extent, and thus would not be desirable by themselves to the accuracies required.

To alleviate this situation two approaches are used.

First the camera density can be increased in areas where such datums exist. This can be done by adding cameras and/or by moving a camera or a 'nest' of cameras to the required location, itself accurately known, so as to view the part datum. Where many cameras are used in a cell, it is noted that only a subset of datums needed for the task at hand need be processed in real time (or at the speed needed).

Second, multiple cameras can be used to view a single part at different locations simultaneously, and create a best fix locations scenario to extract the necessary accuracy. This is illustrated in FIG. 5a.

Additional datums (e.g. laser lines) can also be projected as needed to provide a sufficient number for extraction. Such datums can be projected to create a large 'bank' of applicable data. This also serves to minimize effect of error in any one datum.

It is noted that while one camera from the top and side is sufficient to obtain a 3 dimensional position of the part, two cameras give range data from both directions due to the stereo effect and are preferred. In operation, the cameras feed data to the robots which then position the front body hinge pillar in the correct up/down-/fore/aft and side to side location along its length, in other words, in all 6 degrees of freedom.

In order to position the part in correct position, the robot may or may not actually have to work against the forces of previously welded on parts to the part in question which may have sprung it out of position slightly due to variances in the part. The amount of force to mate the parts is detected by force sensors in the robot and utilized potentially to modify the actual location to a new known location that takes some of these problems into account. In this case the errors caused by not being in the exact, correct location due to distortion difficulties would be made up for a little bit at each location along the part so that the total overall error was minimized. There are many other error modification schemes that will be discussed below.

In any case, the hinge pillar (which may be part of the body side at this point) is positioned and the roof rail part which is characteristically a loose part that is not attached to other parts at its final assembly point is dropped into place. While we are showing the right side operation, virtually the same thing then would be done on the left side after welding was complete; unless of course there were completely separate robots.

In FIG. 5e, the robot 550 positions therefore the front body hinge pillar portion of the body side 551 in space and at the correct location under guidance from the cameras 552 etc. to detect its edges 553 the hole 554 location in the front of it and from this determine its data in space using known principles (see for example references). Furthermore if it is visible as it is in this case from above since the roof rails are relatively narrow the actual position of the robot is also located in the same field of view as the cameras using target datum 560 on its end effector. Thus everything in this case is basically known. As the roof rail 565 then is brought in by robot 566, it can be positioned also using target datums on the robot plus the edges of the roof rail in correct position by analysis of the location seen in fields of view by the cameras 552, which also are positioned along the length of the car (out of the paper).

When it has been positioned correctly, a laser welding robot (not shown), optionally with its end effector in the view of the camera, although this is not so necessary at this point, and puts the weld bead down. Since everything is known, including where the laser beam actually hits (which can actually be seen by the cameras and in fact the laser beam itself can be seen by the same cameras if a visible or near IR laser is used). Thus an extremely precise location of the laser beam on the metal surfaces can be made and the exact position relative to all surfaces known when the weld was down. Indeed the same cameras can actually with appropriate grey level sensing ability see the length of the weld—An important point for quality control.

If this however was the other side, the second roof rail to be welded, it could be that the roof rail would have sprung upwards due to distortions in the flange that it was welded to, due to distortions in itself, or whatever, as shown by the dotted lines, leaving a gap W. In this case robot 566 positioning the roof rail would push it down (dotted lines) against the other part until they were joined. The actual mating (i.e. physical contact needed to insure a good joint) would be sensed by force sensors on both robots which would detect the differences in forces (they both go up in this case) when the mating occurs. Also the actual mating can to a degree be seen from using the cameras above.

To aid the vision system, particularly at the points where joining is to occur, laser engraved targets can be used on the parts.

It is noted that the guidance of one robot manipulator to another is made easier since the same camera in some cases can measure the targets on both and achieve an instant and accurate dimensional relationship of the two. The same holds true with targeted parts. Using the optional targets shown on the pans in question one can again track at the point of closure of two parts to be joined. The targets are ideally placed near where operations are to be performed, so that the local datums are best known and can fall under a single camera which maintains the utmost accuracy.

In some cases it is required to see the position of local edge points to be welded, as well as target locations which maybe in the part interior. There can be seen from overhead or by sensors as the robots position to do work.

The large nest of cameras overhead such as shown in FIG. 5e is very feasible since these cameras can be well positioned and calibrated periodically using for example known datums in the floor such as shown or elsewhere. Alternatively special calibration tools or models can be brought in as well for the purpose on a periodic basis. These calibration techniques also work for other 3D sensors such as laser range finders.

If an operation requiring exertion of substantial forces is to be then done on a part with it in a known location determined by optical datums, the part may be manoeuvered into position manually or with a robot independent of the hydraulically locking claps on a tool or conversely the hydraulic or other brakes may actually be applied to the robot joints. It is noted that because all of the datum references for this particular operation are taken from the targets typically on the part, the actual method by which a clamp unit holds the part is immaterial. It can be in whatever manner provides the best grip independent of any locating features or what have you.

Non Precision Holding Devices

The invention allows the use of vacuum suction cups, magnets, and other non precision holding devices to be used to position parts, since actual position is determined adaptively by the optical sensor system. This allows body panels to be held if desired from an outside surface (e.g. the outside of a door), rather than from the inner door panel or an edge. This is illustrated in FIG. 5a.

It should be noted that while multiple points can indeed be positioned, the ideal is to have those points where only one set of points on two mating panels has to be held in juxtaposition to each other firmly at any one time. This is aided greatly by having high quality panels such as those which are formed on hydraform presses and the like. Clearly if one must use too much distortion then there are problems.

Other aspects of the invention concern situations wherein the robot utilized needs to hold in position an object which cannot be seen from the relatively fixed cameras of the cell. This can happen where a part is an internal part, or where one simply can't have a universal cell with cameras everywhere, In this case, the robot itself end effector is observed from the camera system overhead, let us say, while the robot itself either a) through tooling such as that shown which is picked apart on by specialized holes, knows where the part is relative to it (which could have been confirmed or also guided in a similar station elsewhere); or b) a further camera unit located on the robot determines where the part is relative to the robot. This is in the case where one has to pick up a part at random without special locators but has optically based locators such as holes, targets, etc., from which to operate. Other than potential stack up in error which is relatively low since the target datums which can be retroreflectors, etc., on the robot can get quite precise robot information, utilized this system is workable. This is particularly useful for example for locating parts down inside the body structure when viewed from overhead.

Fixturing of parts in robot gripper. Means to deal with occasion of the part

In some cases a two stage determination of part location in space is required wherein the camera overhead or to the side determines robot end effector position holding the part (rather than the part itself directly) and a second sensor on the robot, generally a camera, or structured light sensor determines part feature location relative to the end effector.

To position a robot, signals are fed from the camera or other sensor system preferably at a rate of 60 HZ or better. Once the parts are determined to be in the correct juxtaposition, there is a necessity to hold them there while the laser weld or joining process takes place, which can be several seconds. To assist this in stabilizing the following can be used.

Where datums on the parts are used, it is possible to grab the part in any suitable manner, as position can be determined by observation of the part, and feedback to the robot control. Where occlusion of the part occurs in the process, the part, and the robot gripper or other reference location can first be sighted in a non occluded state and the part to robot position determined. Then the sighting can lock on the robot, making a suitable co-ordinated transformation as desired to determine part location at the occluded position.

For parts which cannot be suitably targeted or whose natural features don't provide a reliable solution, the robot tooling can grip the part on known locations (e.g. holes, surfaces) which then can be used as a new reference. Sighting of the robot datums can then effectively give part position (e.g. a set of target points on or near the end effector).

Another embodiment of the invention for manufacture of car bodies would use adjustable locating details positioned according to the invention. This embodiment is based in many respects on the apparatus of FIG. 4a, but is utilized for construction of the body itself. In this particular case, the locating details to be positioned are not those of the tooling as in FIG. 4 but those on the sub-structure of the body used to position the body panel surfaces from the inside. Noting that the tool position the same surfaces in many cases from the outside.

The type of construction is typically that pioneered in the Pontiac Fiero, later carried on to the Lumina APV van, both of General Motors. In this case, a metallic sub-structure is utilized on which locating pads are placed, which are in a "mill and drill" fixture machined to have the correct dimensions of their position of their surfaces and tile location, used for what are generally composite (e.g. plastic, RIM, or SMC) panels for the fenders, quarter panels, roof fit, etc. This construction technique has recently been expanded to cover designs such as the Ford contour, recently shown at the Detroit Auto Show, and others which use a channel type aluminum construction with the same requisite mounting of the panel (see referenced article).

The mill and drill fixture utilized in these previous applications is similar in many respects to the fixture tools of the prior art described in FIG. 1 above. However, rather than position panels for welding it is used to actually mill and subsequently drill surfaces and holes on the metallic members of the substructure. This requires, lot example, 40 or 50 mill/drill heads, all correctly positioned at the right 3 dimensional location. It is thus a dedicated fixture to build one type of automobile in general i.e. that it has the same lack of flexibility as prior art weld fixtures as described above.

It is because of this, and other reasons that the Pontiac Fiero plant, which was tooled to produce as many as a 100,000 units a year was closed when the volume hit 30,000, and appeared to be dropping further.

There are at least two ways in which the invention can be utilized to solve this problem of space frame manufacture. One, is to create the sensor controlled robotic equivalent of the mill/drill arrangement; that is with a mill and drill head, mounted on a robot, which is sequentially positioned at the different locations in order to effect the necessary and surface and hole locations. Typically the surfaces and holes need only be located in the 3 cartesian axis.

Such a robot is relatively easy to provide in a three axis cartesian mode, although other locating details might still only have 3 degrees of freedom, buth they might not be the same 3 degrees. For example, they could be one angle. We should note that as the angle requirements go up from 3 degrees, the robot complexity rises rapidly, and the difficulties of providing such a robot in accurate fashion become extreme. It is for this reason that the sensory guidance, which is useful even in a 3 degree mode (as in FIG. 3a above) is even more useful in a 4–5 degree mode.

A second arrangement to achieve the same objectives that is the positioning of the body panel in the correct surface and hole location upon the surface, and in reality one should say to correct that the axis of the hole in the correct direction, since the surface defines the normal to the axis of the whole, and therefore with the hole location on the surface the axis itself.

To establish this one could also use techniques which are cheaper and easier than milling and drilling, and in addition which require less force to be exercised. One of these for example is to have a positionable surface which can be locked down with a weld operation, such as arc weld or laser when it is in a correct position; a manner virtually the same as the extendable ball joints on FIG. 4 for the tooling, which are locked down hydraulically or mechanically, in fact mechanical locking such as with set screws, etc. could be used if enough force and a permanancy could be obtained. This might however only be achieved by welding them on.

It is noted that this operation while a little difficult to do robotically is quite easy to do manually, and one could set it all up manually, and then cause it to be laser welded when it was all set.

The second method is to have eccentric holes, which allow a plate to move in the fore/aft, and up/down direction, and simply use a plate of different thickness, which would be selected according to the visual data. In other words a select fit operation, this is highly practical and can even be used to select plates which are angled, again which can be verified by the vision system. This particular version since it is different and of course also of use to the fixture of FIG. 4a above, As shown a space frame type of body/chassis is in a station comprising a robot probably (and others not shown), whose job it is to sequentially install the mounting plates for the outer body panels, under control of the optical control system; itself comprising cameras, overhead and to the sides, which will be described further, or other mechanisms described in other bodiments of this invention and the the co-pending applications.

As shown, the space frame, in this case made up of aluminum sections, has a good quality panel detail mounting face, and of course as probably 30 or 40 other locations on the space frame as well, where locating paths and holes for the panels needs to be placed. The problem is that as the space frame is assembled, either via welding or some other technology, the actual position of these body locating positions is not accurate enough in angle or in cartesian X,Y,Z location to act as a reference for what amounts as a "world class fit" of body panels, that are attached. For this reason, additional spacers and angle plates are needed, which can be also moved in the fore/aft and up/down directions in eccentric locating holes.

These plates are installed by the robot sequentially down the body, and can be controlled by a fixed nest of cameras throughout the length of the body as in figures above, or can be controlled sequentially by using a single set of cameras which have viewed the body in different areas in a sequentially manner, similarly to the robots, for example in this particular embodiment is illustrated by having a camera set overhead and to tile side, which is the robot work area, but the body itself is moved on a precision mechanical guideway down a path in the fore/aft direction to allow different points to be accessed. Clearly other possibilities exist, such as leaving the body freed and moving the robots and the camera systems is easily done if one admits to a gantry robot system with a single robot at a time. Accurate references can be taken from the floor. This helps illustrates one of the other points.

As shown, the camera systems has determined from the position of the body (including reference points on the body that the spacer should be positioned at point P, and should be angled such that the small angle X of the surface is accounted for. The plate is then attached.

How do we measure the small angle of the surface? There has to be a first measurement step, and the surface of the space frame is generally untargeted.

There are two possibilities for making the measurement of the positions. First of all it can be done as shown with standard vision hardware. For example, the surface can be found by sensors such as the Diffracto Z sensors, used for determination of 3-D surface location and hole location on the surface, as well as slots. These are described briefly in the attached brochure.

Alternative such a sensor mounted on the end of the robot, with known robot positions, as via target datums can be used to find the position of the surface with respect to the robot, or if mounted externally with respect to an external reference frame, and if the robot then is known relative to the external reference frame through system, then the body positions can be known.

Alternatively, targeted chassis members can be used whose surface points, which are determined photogrametrically using the systems above, and together with hole locations on the chassis at which mounting is to occur. Since the holes are known to the targets, the targets are known to the photogrametric system, and thus everything is known so that one can determine the hole position, and the surface that the hole is in, in total 6 degree space.

In some cases, hole location may not be an issue since one might wish to do this operation without having pre-punched or pre-drilled holes in the chassis members i.e. by attaching a plate which itself had the tapped hole or other fastening member such as a bolt head, a screw, or the like, in it. This case is depicted where one seeks the position a plate, having an attachment device for an outside body panel, which can be anything required, in the correct location on an otherwise bare chassis surface; itself an arbitrary planar location. This positioning is done totally according to the invention using the photogrametric positioning system.

In this case it is determined that the attitude of the locating member, in this case a plate—with a nut—whose axis is shown in dotted lines used to attached a panel is to be positioned in a certain location. This location is relative to the axis of the chassis system, as well as in relation to other positions which are to be further located in relationship to it. In this context, it is necessary to position the nut plate as shown.

Another idea is to attach a plate with targets and a tapped hole, and Lock down to body. Then locate spacers on it and assemble.

The actual sensing of the location of the body, and the adjustment of the corresponding locating details can be accomplished in any method with suitably accurate results. Suitable methods include targeted datums on the chassis component for photogrametric mensuration, datum holes, which are used for location using off-centered mounts, and light sensing techniques for sensing surface locations.

This system also allows the build of different vehicles on the same line using the same basic chassis construction. One only needs to change the adjustment points for the outer panel in order to rearrange the outer shape of the car, leaving the inner shape alone. While we don't wish to minimize some of the difficulties herein, it is noted that the degree of spacing, the angulation and the location fóre/aft and up/down of all the locating holes can be varied simply according to program changes, for the utmost and total flexibility.

Similar is assembly of rigid components of the space frame itself

Part A is bolted to Part B using ball jointed lockable stud plate positioner attached to Part B in a slip mount. Once the correct x, y, z location (and if necessary angle) of the plate is achieved by consideration of targets or other features on objects A and B, the stud plate is moved to the correct position and locked down.

Also contemplated is a method of the invention for achieving accurate location of the various components using multiple views of different locations of the component and the combination of data therefrom.

The problem of positioning the car body panels in space for flexible body framing is a substantial one.

First, in order to achieve minimum cost and maximum flexibility, the minimum number of cameras is desired. This means the camera field of view has to be substantial, if we take a maximum case, that is a camera every 500 mm. This means that if it has 500 pixels, each pixel is 1 mm. Hardly the stuff that resolutions to 0.1 mm for example, are made of.

However, there are multiple cameras looking at a part, at least a large part such as a side frame, at any given time, and therefore one gets multiple kicks at the can so to speak. How though could you see a miniature laser engraved crosshair under these circumstances? This needs to be resolved. Just to find natural holes in some of these sheet metal parts that are 10 mm in mixed position could only be done to 0.05 or 1 part in 200. This being the case the key here is having multiple cameras, and taking intelligent views of all points.

If all else falls, one can simply increase the number of cameras; particularly along the length, but not necessarily across the width of the part or assembly. For example, cutting the field of view to 10 inches or 250 mm increases everything accordingly, and this becomes not too far removed from the case of finding the large holes on the front body hinge pillars that were 4" in diameter. However, one had all the points of the hole from which to work.

The idea of moveable arrays of cameras is also possible.

For a car 200" long, cameras every 10" are 20 cameras along the length, both top and side, and probably bottom, or 60 cameras per side. To make this work out with a lot of points, it would be nice if all cameras would have points to look at, which would mean artificial datums at many locations.

There is however, nothing wrong with 60 per side. This would be probably 200 then for the whole cell, which is not much different than the large 100 cameras Z sensor installations. The fact is, is it crazy to think of 300 cameras per cell? Since one at any one time might only be controlling 20–30 cameras of the total, this really isn't too obnoxious. It is just a big 'switch' than a real time multiplexing problem.

There is the problem of temperature and the difficulties of making accurate measurements over long distance throws in such situations. This could have to be accounted for. One idea would be air condition the plant, or keep it within some reasonable range, because it is really not so much ambient temperature that is the issue, but variations in temperature which could cause widely variant readings. Another interesting question is whether cameras in the vertical direction have to have 10–20" of range, it is not clear that they do, because of the fact that all cars and light trucks, are more or less to the same heights, and the underbodies at a known base. And too, how about the idea of the floating platform that floats down. Aa camera with more field of view, such as 1000×1000 is entirely possible in the future.

Note that we have to look out for camera calibration issues. There would have to be some massive calibration of the cell, which is quite possible if all cameras and their lenses are fixed.

The second idea, of course, is a moveable camera site, since in any one body example, we can move something to a given location. Calibration datums in the floor or wherever could be used to calibrate the camera positions.

Intelligence Issues

Assembly using rough positioned but otherwise held part and programmable robot.

Localized pushing in of metal on top of other metal in order to create the effect of a clamp situation in one area can be done with a robot. Monitoring the other areas, taking out any deformation or, let us say, movement of the other areas, due to deformations caused, what have you, by the clamping type action at the first area. As a curved (eg by deformed stamping or transport ) part is pressed down at one end, the other end tends to rise. We measure where it is in space, compute where the new press down point is, and the effect on the other parts. We compute knowing from either a) experience, b) mathematics, c) something else that the part will actually go back down and be welded in the proper place at the proper time.

There is a teach mode to this, where we purposely push down, cause the robot to make a weld of a good part in the right area, and teach it what the popped up, so to speak, location of the part (and potentially its mate or mating parts) looks like dimensionally and that becomes the norm from which a best fit is made The issue is multiple points, multiple parts, and multiple whole assemblies. Illustrated in a error reduction strategy block diagram, it isn't just vision that has to be sensed it is also forces, so it is an and/or force vision plus knowledge of the above.

Intelligence Issues

1. Push on one side. Account for distortion in other panel.

2. Push on one side of part. Account for pop up of other side due to non-perfect match.

3. In above cases, some of the key issues are sensed distortion or pop up, and compute proper place to place welds. Move panel if necessary.

4. In complex structure, bend metal over to fit, knowing what dimensions of one or more other parts are, or locations.

5. Spot weld one end of panel, then go to opposite end and spot it, etc.

6. In system with multiple components, adjust for misalignments by taking it partially out of each angle or dimension, rather than In any one point.

7. Hole fits—If hole comes from stamping plant out of position, then we can
  a) add a little error to both sides in order to get the hole location as good as we can, or
  b) enlarge hole (to fit a bolt say) with laser which might be in the cell anyway for welding 8. Certain famous areas; doors, windshields, hood, deck, etc For example illustrate distortion of windshield 'A' pillars with a cross piece atop to max fit the windshield, knowing the width of the flanges. This is "stock balancing" of car body. Assures all parts go together to make an acceptable final assembly with minimum overall error and as near zero error as possible in critical areas according to preset or learned rules.

9. To assist development of process, can very nicely
  a) simulate accuracies of photogrammetric positioning
  b) simulate robotic operations given deformations of panels In another embodiment of the invention a laser material working system is utilized to perform not only the welding of the components. It is actually used to "intelligently" modify one or more components for the next operation. For example consider a cross member piece with tabs which are to be inserted into the slots cut by laser or—in the cell of FIG. 5d or other figures, These slots are cut precisely to fit the actual width of the part in the correct location in the underbody. (note pins and holes rather than tabs and slots can be used, as well as other mating details as needed)

In this way variations in metal due to the bending, let us say, front to rear, etc. can be determined and accounted for. The actual determination of the slot cut to width can be a standard width which is simply cut into, let us say, 1.5 meters which is cut or it can be actually to fit the part tabs that has been chosen for entro, premeasured in either the cell itself if suitable datums are on the part as it is brought in, or at some other point. The measuring in the cell itself of course creates a total accurate base since the local differences are all that is required.

The invention also contemplates production of optical target datums to aid positioning, much as the slots and tabs do mechanically.

The invention includes an embodiment in which the laser unit (for example the one used to trim the part after drawing has been used to make a set of circles or cross shape targets. Both target types, or for that matter any other usable type, can be employed. In fact some times it is good to diversify the target types in order to distinguish which is which, so as to determine part orientation, type, etc.

Laser targeting can be done fight in the assembly cell, but in this case is illustrating targeting in the press shop, where the panel location is already determined by a die, and the laser is employed to trim and punch.

In this particular embodiment we also wish to show the advantageous use of the laser station to prepare the components for assembly in a unique forming plus assembly cell. In this case, the just formed component (for example formed in the hydroform press or an expoxy die) is trimmed of its excess material by the laser shown and including the preparation of the tabs which can be placed in the precut slots on the floor panel by robot or operator. It is noted that the laser welder used in the weld station can be used to cut the slots. The slotted precut part with many holes (also desirably put in by the laser) is then positioned in spaces as disclosed previously. After this part has been welded the second part to be fitted in it can also be slotted.

Two targets are used with a camera system together with a natural feature of the part, in this case a hole to provide 3 or more points used for six (6) degree of freedom positioning. The camera(s) can find the edge of the part as well to help determine the part in total 3 dimensional space. The target put on however are known in relationship to the primary location datums of the part such as a gage hole and face. It is noted that the hole which has been used as a target point hole, can also be a location hole (for another operation, for example).

Where possible it is desirable to use retroreflective or other high contrast targets rather than lower contrast laser engraved targets in the base material itself. One can also use the laser to burn off coating material to create a target as well.

The optically visible target datums are used, if desired to allow pick up/location of the part by robot or other tooling, wherein camera sensors on the robot or overhead can guide the robot to locate on for examples holes and the part lace surrounding them. If these points are known to all other datums on the part then the part can be located subsequently in space for welding using the robot or tool co-ordinates.

The invention includes the build of a body by joining individual pieces in a sequential build up basis rather than as the "framing" of major sub assemblies. This is very difficult to do using present hard tooling technology can be accomplished with the invention using fully flexible positioning of all parts.

In this particular embodiment the bare floor pan without structural supports is shown in the work station. An individual component (e.g. a frame body hinge pillar is brought over to the floor pan and cow and positioned in 3D space using the target datums by a manual operator or alternatively by the robot system. This part is then welded and the second component is then placed on end and so forth till the body is put together.

Some components can be reasonably pre-assembled in loosely tabbed form, and welded in accurate position. Note the use of special mini clamps or ties which could be temporarily used, and removed by an operator of if plastic, burned off by a laser welder).

To recapitulate the sequence, a floor plan is brought into place and the hinge pillar is tabbed into the floor plan and positioned for a fore/aft up/down, side to side using manual or robotic positioners. Where tabs are not employed (which fix the side to side and fore/aft direction with the resting points fixing the up/down), the 3 cartesian axes, and angles can be adjusted.

A laser welder (or other joining device including glue or whatever) then comes in and places welds along the critical joining areas. The parts are then positioned again in 3D space while the next part is positioned in and the welding process again repeated.

In this embodiment, sheet metal panels forming portions of the notor compartment section of a car body of unibody construction are loosely placed together by an operator using tabs and slots provided in the panels, and/or other aids such as removable fasteners and ties described in the invention herein.

The loosely assembled structure is then conveyed to a welding station according to the invention (which could be the same station) wherein each set of panels (of any two or more to be joined) is positioned by a robot according to the invention, When each panel is determined to be in correct position relative to each other (and to the rest of the ensemble of panels as measured or predicted) the laser weld robot, or other Joining device welds the two together.

The holding robots then proceed to a next location and repeat the process optimally positioning each of the panels under sensor control until all panels in the subassembly are welded relative to each other.

Since all metal positions are monitored (or known via physical locators to the robots, whose position is also monitored), the optimum positioning (also including positioning in contact for laser welding) including deformation and clamping of less than perfect metal shape can be done to minimize the total error of assembly.

The camera/sensor system overhead and to the side is designed to allow visibility of datums on all parts with no meaningful occlusion—for this purpose parts are designed with datums to be so visible. If occulsion still results (which can be determined in a pre simulation of the process) certain parts (generally upper, or outside) would have to be sequentially added, so that more interior parts could be welded first.

Build Up to Reduce Subsequent Interference

In building up a sub assembly or body step by step in this fashion, it is desireable to "build toward the laser" (or other joining device), so that parts put in 4th, do not get in the way of those done 6th; say. This may or may not require a different design consideration. Typically one would build lower parts first, going upward. Alternatively one can use a laser unit capable of going inside the structure. This is made easier with small laser heads and even fiber remoted lasers.

Extensive Use of Loose, and Even Temporary, Joining Devices

The technique is ideally suited to loose initial positioning of at least a portion of the structure, with the robots doing the final accurate positioning. Thus people can assemble the body using tabs and slots in a far more comphrensive way than today where such a procedure is generally only used in the final frying operation ("marriage" station) where the sides are united to the underbody and roof.

Other temporary holding means can also be used, such as ties, plastic or other removable fasteners, C-Clamps, quick drying glue and the like. The laser welder can even be used to cut off or otherwise eliminate the temporary holding devices.

Even where tabs and slots are used, these can be simple, slotted/interlocking even dovetailed as the case may warrant. The unique ability of the invention to force under camera/sensor/robot control one surface of a member at a joint against another member at the joint allows one to easily laser weld the two together even from one side.

Another aspect of the invention is the method of building the body starting from the bottom up but moving from the top down on a specialized elevator. The idea here is to keep relatively constant the relative stand off distance from the camera systems to the zones being observed such that the sensor units are kept within their optimum functional fields of view. This is particularly the case with overlapping stereo images, with projected lines that are focused etc. There is always a typical working distance of best results that can be appreciated that the fields of view are angular in definition as well. But particularly the focus can change and it is highly desirable not to use either zoom optics or variable focus. While these are not precluded in this invention they do constitute sources of dimensional error in either magnification or position of the image.

Need an error discussion. Do we need an intelligence discussion? Needs more discussion generally.

There can be employed monitoring of targets during body build-up, and subsequent addition of trim. One of the advantages of the disclosed invention is that if one builds the body up in place (or any other assembly such as aircraft, buildings, etc. according to the invention), one can eventually note the total location of all parts in the body, in absolute co-ordinate space and in reference to one another. This is because one can track the initial and final locations at their welding and after subsequent attachment of all target points that can be seen.

This has major implications toward the use of intelligence for the integrity of the body and its subsequent optimization, and indeed it has an additional benefit in that one can use the body co-ordinates so obtained as references for the installation of other pans into the car as well, such as the seats, batteries, tail lights, brackets. etc. All of which can then be automated robotically since one knows exactly where the attachment points are, and indeed one knows as well thanks to the same camera system in the same place, where the robots are. Thus total knowledge is obtained without any guess work about the situation.

This then leads to the automation of the assembly of the rim of the car and all of the major sub-assemblies such as doors, hoods, deck lids, wheels, bumpers, etc. that are put on after the body is completed.

As has been pointed out in one of the referenced co-pending applications, in an assembly situation such as this, it is possible that the targets of one part will be covered up when the subsequent part is placed on top of it for a further assembly operation. In this case the data co-ordinate system is transferred to the new part, and the knowledge stored.

Because of the advantages of this system, there becomes an incentive to leave the body in place for all further assemblies, which can be done uniquely in the same cell. However, if one for various logistical reasons has to move the body, or for that matter any other sub-assembly to which further operation to be desired the same sort of co-ordinate alignment operation where the cameras are use to look at the target position of the part as brought into the work cell, and used to correct mathematically the co-ordinate system of the cell to that of the body for the future, except for small correction errors would be the same as if one had left it in place.

There is contemplated an example in which the same work cell as mentioned above is utilized to assemble the door onto the body. All data points on the body are known from its own build and have been stored in the computer control. There is no need to measure them again although as far as the ones that are now on the outer portion can be monitored constantly from those cell cameras which can see them. However, it is not necessary to see all of the points as they are known during build up. What we can know is just a few critical issues from which the coordinates of the door are now measured with cameras, and used to guide it into the opening. Since all parts are static at this point, it greatly simplies the calculation, and one can virtually head straight for the opening and put the door in it properly, while bolting the hinges down in the correct location, in eccentric holes for example. The reason for this is that all doors are not perfect, even though they are made with this system, they might become perfect enough where one wouldn't even need to move to accept the holes.

Another form of this is to make the door in an existing system, and transmit the data from that cell, if different then the final assembly cell to the final assembly cell, in which case the door co-ordinates are already known, no particular monitoring is needed, and it can be bolted directly on, using a laser cut hinge hole precisely for that door at the location (yes, illustrate this as a case of cutting to size!).

The invention also includes an assembly of further parts (door, taillight) of the vehicle (or other assembled products) using the same basic system.

Assurance of laser weld fit up is achieved using the invention. As pointed out, relative to FIG. 2a–b one of the potential advantages of this invention is that it contains the intelligence for both dimensions and force, to effect a known substantially zero gap condition, such that the correct action of laser welding can be applied.

This is the case in which a sequential weld scenario of two robots holding the parts together while a third welds them. Since the robots holding the two mating parts together can be both optically and force controlled according to the invention, they can assure that the gap is indeed sufficiently closed such that the weld can occur.

The key here is that the invention is not limited to a discrete set of clamps, but indeed the parts to be positioned can be positioned with the holding devices in such a manner that the parts can be pushed together until the zone in question is determined to be at a close gap condition. This can also be effected as in FIG. 5c with one robot pushing a part against a fixed part.

In the first case correct mating is achieved by a force control only, wherein the 2 robots holding the parts, press the parts together at points until the force monitor on the one side reads that it is being pushed from the other. For example, when the force sensor reads a sudden increase in force due to being pushed from the other side.

If at this time, with the two in contact, and the vision sensors overhead can determine if the forces are pushing it too far to one side or the other, in which case force could be applied from the other side to move it back again, for example. If then the third robot comes in with the laser unit to weld the two together at this point, at least the closest point not obscured by the robot, a weld is then positioned and the robot can indeed move to the next point. In this effort, however, it is much like programmable robotic clamping.

A second situation requires less robotic manipulation.

In this case, the 2 robots hold the parts as before, but from some central location. They move them however in a manner to be determined from analysis of the dimensional location of the parts, as seen from a camera unit, such that the individual zones are indeed in contact. When the sensor system has determined that contact has been made between the two sections, as seen from the sensors above, or to the side, or wherever, then the signal to weld is given, and once the weld is made, moved on.

However before moving on, a determination is made that tile weld did indeed take such that as the force function applied to either or both of robots is removed that it noticed that the welded area does not revert back to another previous or other condition indicative of the fact that the two parts have not been properly joined.

Because there is an incentive to pull the object as close as possible to where the weld is expected to occur, it creates the desire to hold the individual parts at one end, or at some middle point let us say, and then be able to sequentially move the robotic holding devices, such as claps, suction, vacuum, etc. to successive locations.

One of the advantages of the invention, that is using visual location data and forces to determine the correct positions and functions of the welding process, allows one to hold the parts, in a means that are not necessarily classically rigid or known with respect to all the points of the part. This opens up the possibility of using magnetic claps, suction cups, with vacuum supplies, and other holding devices which have relatively arbitrary locations on the part, but are capable of holding it in position. Solid dimensional precision is determined from the camera system. The actual way in which the robot grips the part, is not as important. Therefore one can consider that the two parts could be held in the middle, welded there, with the sensing devices observing the ends as well, to make sure that the positions have not been too far out of place, that they could not be brought back in, and the process proceeded in one direction or the other, until all welded zones were desired.

The procedures illustrated above can be further assisted if one puts through, in the first run of panels through the system, specially targeted panels (eg the side frames of FIG. 5a) which can be loaded onto the tools and observed from the sensors units to determine their dimensional locations. This then provides a double check on the tool positions as well as assures that the panels are indeed where they are suppose to be as a function of other operations such as loading, robotic spot weld, clamping, or the like. Indeed this ability to self check, in particular where targeted panels having known high contrast datum points are utilized is a major feature of the invention.

The invention also includes the use of targeted body metal to check out any individual station's operations. It is preferred (but not necessary) to utilize the retroreflective targets illuminated by suitable light source(s) which can be very accurately denoted in their positional locations. The system overhead can check not only the position of the parts as loaded and clamped if they are clamped but on top of that can be utilized to check the position after welding as well and feed this data back to the central system, where optimization programs can calculate the new improved locations and tell the operator (or robot) where to move them.

The data taken from the inspection process is used to feedback as shown through the control sequence to the alternate positions at which the operator is then instructed to reposition the tool.

Considering a block diagram of a very desireable simulation feature of, and with, the invention, With part datums precisely known, one 1. Can simulate optical performance and photogrammetric mathematics.
2. Can simulate the control system.
3. Can choose to add new datums (interactive CAD) to make work.
4. Can choose forces, locations, other intelligence.
5. Can do 'What if' on bending, out of position holes, etc.

The invention lends itself to simulation of the process, since the locational data regarding each of the points on the parts can be predicted by reliable photogrametric means, and in addition the robots can be verified in their positions, and all data is used directly coupled with the motion control of the robots, or other positioning devices.

For this reason, it is possible to simulate what is actually going to occur in the plant with veracity, and because of the accuracy of the simulation, down load the programs to the robot, once they are perfected, and know that they will run.

There are several parts to this simulation issue. The first is the actual assembly simulation, as in the mating of the parts, using 2 or 3 co-ordinated robot motion, including joining.

The second area is to simulate the photogrametric issues, and where necessary plot different photogrametric strategies, for example, using 2 camera stereo instead of one in a particular application, or adding additional targets to a part, such that its photogrametric data can be more reliably obtained for that location (realizing that targeting cost money and a relative minimum of targets is generally desirable). Indeed the line projection unit and its function can also be entered into the simulation, and since this function is known to be quite accurate, can lead to the same true solutions.

In some cases, additional photogrametric equation solution complexity may be required in order to achieve the requisite accuracies with the various points used. Additional points, such as using the projector, may be required to be determined on the part as well to achieve the accuracies required. AH of these issues are with the invention capable of simulation, and are an achieved advantage of the invention.

A body side component has potential targets which can be used.

The first are those which naturally occur in abundance on the inner panels, which is filled with holes and notches in various locations. For assembly of all subassemblies, it is practical to look at these natural features and assemble the parts from the inside out if need be in order to have a clear view of the features The second of these is a laser engraved targets, which put on a trim stations or elsewhere on the press lines that make the door. At those points, all of the outer metal for example is known relative to other points. Another point shows paint dots, or other marks put on it, at the weld stations, where the door inner is welded to the outer. This is particularly the case if the doors are made in a station such as the one here disclosed, which incorporates a laser welding capability, which can also be used to target marks onto the panel. It should be noted that the marks are put on very lightly, and the camera systems are nonetheless are easily painted over in the paint shop, so they do not appear on the outside.

Other targets can be painted groups of 3 or 4 target sets, say, or a myriad of other possibilities.

Methods Of Target Application

For best operation of the invention, target datums are generally desireable, in addition to applicable natural features or projected target zones. Where target datums are present on the part, in an accurately known manner, they allow the total data base of the part to be determined, in an unambiguous manner, with relatively simple and fast camera processing.

The question becomes how can one place these targets on the parts.

In a previous drawing, we have illustrated several of these target conditions on the parts, without really discussing their implementation. For example the laser engraved cross hairs, concentric circles or other types of targets that form unambiguous metrologically correct targets with accurately defined centers, can be placed on, very conveniently, in the trim dies in a laser/rimming operation, where a laser cuts a path around a part to trim, and for that matter punch holes in place of special trim dies or punches. Such laser trimming and punching operations are already used on an experimental basis and according to the invention simply required to program them to place the target datums on it, the desired locations and incorrect juxtaposition to the trimming and hole punching operation, or other areas of the part, which are obviously nested in a press tool.

The laser targeting operation can also be done, as the welding is built up, as has been pointed out above. This allows the targets to be put in, as a function of the previous operation, or some combined group of operations whose positions have been determined. Again the laser is present anyway, because of the weld, and at very little extra cost, other than the almost neglible cycle time.

Clearly another manner of putting targets on the parts, is to punch them in conventionally. In other words, if it is not much extra work, if one is already punching a group of holes in a sheet metal inner panel, to punch a few more if needed for best targeting. Again the simulation as desired can be used to determine whether such additional target datums would be required for the accuracy of results obtainable. This is done by simply calculating the equations using the existing targets, choicing other ones for example, by putting a light pen on an image of the part, saying pick that as a target, and then solving the photogrametric equations within the time cycle allowed, with the equipment allowed, and determine whether that is sufficient. If it isn't, higher speed processors are required if time is the problem, or if accuracy is the problem, some sort of additional target datums could be required, or additional light projectors.

To illustrate further the optical principles involved consider this case in which the potential structural member of a minivan, as shown. In this minivan, it is desired to position each of the structural members vis a vis each other, according to the invention embodiment of FIG. 5e.

Let us consider some of the typical dimensions involved. For example, a member 301, part of the finished ensemble desired 301, is typically 2 m long and of a somewhat straight section; box channel or whatever. A member typically could have holes such as or specially marked datums, such as retroreflective targets.

The key here is that it is desired to position this, using either manual visual guidance such as shown in FIGS. 4 or 5, or robotic positioning guided by such camera systems in place relative to another part. For the present purposes we will assume that this part position is known, in the correct overall location, and it is desired to fit the member to it.

Each of the types of datums shown can be imaged by cameras such as the grouping shown previously.

In order to determine the position in 3-D space for this member, only 6 vector points are required. With the present arrangement however, if all datums shown are spotted by the cameras, then datums are also visible in 2 axes, it can be seen that the number of point resolution points, and furthermore that the cameras are capable of two axes point determination, it can be seen that just on the face of it, that 18 dimensional vectors are possible that relate to the part. This over determination of the part location serves a very real purpose; in that it averages the error on the individual points, which can be significant since the cameras themselves are being asked to find the datums to accuracies that may not be possible on an individual point basis.

FIG. 5a illustrates another aspect to the embodiment of the invention used for build up of a quarter panel sub-assembly. Typically such sub-assemblies require separate hard fixture tooling for each type of quarter panel. Realizing that on one car line there can be multiple models each with its own quarter panel, it can be seen that a large amount of money is tied up in such tooling, which becomes almost impossible if there are numerous car lines to be made in the same plant, each with its own group of styles.

In this case, a single robotic work cell according to the invention is shown. The pieces are sequentially placed in the correct location on the outer body skin.

Itself, simply loosely placed in a plastic holding cavity fixture; made for example from an epoxy casting of the outer body skin of a prototype vehicle or clay model, or alternatively from a wood model machine from CAD data.

The ±10 mm location of this panel is accounted for by the mathematics of the camera system computer, which aligns the part in space and then directs the robot, and place the additional sheet metal parts into the panel, such as rocker rail, rear headlight support, real taillight support, etc. The datums for this placement are in the panel itself, and in those pieces put on.

On the space frame vehicle show the targets templeted on, in for example the bending fixture, using retro-reflective paint. This would be the other mode for getting targets on.

Show Elcon drawing with a single point adjusted according to the invention, such as a pre-drilled targeted chassis.

Another method of putting applying target datums utilizes, as does the targeting by laser trimming operation one, the fact that the part is essentially perfectly held in its position on a female die on a transfer press. It is at that point that the part can be targeted, with a high reliability that the target datums are indeed related accurately to the part geometry, Accordingly, it is disclosed in this embodiment, a system which sprays targeting material or rather forces it through tiny passageways within the die, or in some cases a mold: such that it colours or otherwise marks the outside of the part, as it rests in the die or mold. These holes actually in many ways represent the vent holes that are in dies anyway, and if the target material which is injected in, shown using pump into die such that it marks part with a spot through the hole in the die. If this material is retro-reflective, such as spray-on types from 3M company of the Scotch light family, it makes the job of actually detecting these targets, extremely reliable. However, any sort of sufficiently contrasting material can be detected. Retro-reflective material just have a very high signal with the noise background ratio.

Another means along the same line, but requiring a separate operation is to use a special target template which can be laid on the part, and sprayed through to mark the part.

Another embodiment of the invention is utilized for situations where targets are not able to be placed on the object; sufficient cameras are not in view to allow 3-D data from multiple targets, or the like.

In this case, a line projection unit is shown, which projects a light stripe on the object. In most body applications, along let us say the side of the car, these light stripes should be positioned in the cross car direction, and viewed in an angle from its projection direction, by the camera unit in question. This technology has been well proven in many Dfffracto body gaging installations for measuring within a limited range the location in 3 dimensions of the stamped metal part, for example. In this case however, we desire to extend beyond this, to have a device which is usable over a much larger range but still with a resolution of 1 mm. This very difficult task is accomplished herein by projecting a stripe at a known angle, with a very high resolution; the high resolution angular encoding system, and using whatever camera which happens to be the one into whom the field it falls on its intersection with a part. Indeed for certain stereo camera installations, two cameras may see this line as well, and in which case can use stereo triangulation of their own, rather than removing the line projector unit from the equation.

An optically controlled cell can be constructed according to the invention wherein the control is used to direct the drilling or other manufacture of components.

Besides welding, other operations employing the invention can be the inspecting, drilling, routing, face machining and the like. In this embodiment is illustrated the use of the invention to control an operation other than joining, and in an aerospace application. In this case the operation is drilling of airframe wing spars. In this application a 5 axis robotic drilling head is utilized, together with a co-ordinated motion from 1 or 2 robots. The robots position the part in Space, such that the drilling head can put the holes in the correct juxtaposition.

The invention includes a control system based on the previous disclosed aspects of the invention. This control system contemplated here, as also applicable for current body production technique, but utilizes the novel sensing aspects of the invention to insure maximum up-time and efficiency, A central computer monitors the PLC and robot controllers of the clamping and fixed weld flag station, and the robots weld parameters. In addition one or more of the following are monitored:

a) Robot or weld gun position via targeted datums thereon, and cameras overhead to assure proper programmed location has been reached
b) Body car sub-assembly dimensions measured with a vision gage at the end of the line or other monitored section of operation
c) Clap/locator position with cameras
d) Clamp pressure.

A major advantage of the invention is to allow the maximization of 'up-time' of body production lines, even those of the prior art (such as those depicted in FIGS. 1–3).

In order to maximize such up-time, it is important that all the critical variables that effect body production be known and controlled. Such control can range from simply knowing that a switch is failing to the actual knowledge of the physical positions of various critical components to the knwoledge that the weld currents, etc. that are used, or laser power levels and other factors are correct.

It is to be understood that a control system of major nature is contemplated in which a central control unit; for example running on am IBM PC, is connected to the programmable logic controllers (PLC's) that reside in the clamping units for the, let us say, body-in-white fixture, and obtains therefrom the knowledge that the clamps have made or have retracted, and if desired clamping pressure. Similarly at the other end of the line, the inputs from the existing optical gages were used, or any other gaging systems that may be applicable, such as CMM's and the like are inputed, together with the knowledge of what particular job number is being worked on, so that all variables create to the production of a single job (i.e. one particular car body) can be linked.

These are the basics of the invention that apply to existing lines. However, very. importantly is the addition of further datums that result from optical embodiments here depicted in the figures herein included. These are, for example, optical sensors to determine the position of robots as illustrated in FIGS. 3, 4 & 5, whether they be positioning robots for locating blocks, or welding robots, and where the targets could be on the gun, as weld guns as shown.

In addition, where visible, targets can also be, as it is illustrated in FIG. 3a, on the locators, and observed by cameras, etc. Thus inputs as to where locator positions are, where robots are in space at the time of weld, and as well as all of the other variables of the line, are inputed into the control system, and a critical analysis made between the various positions and the effects on the dimensional integrity of the body, such as determined by the gages.

It is of particular interest, since there arc a very large number of variables perhaps several hundred if not thousands of switches and other details on such a line, as well as the various pressures, weld currents, robot positions in as many as 6 axes each, clamp locator blocks as well, this is a great deal of information. For this reason it is also desired to prioritize this information to track only those critical points at least on a real time job to job basis that cause the problem. For example, let us consider that a dimensional measuring sensor of the final gage begins to pick up, that a particular position on a critical door opening is trending towards the outer limits, as it does this, all those particular variables that effect that area, which could be 3 or 4 NC locators, positions, several robot positions, welding in that area, certain switch, and claps, etc. all then become tracked with other less critical or demanding tests put into the background.

Other Points

In the embodiment of FIG. 4c, any or all positioning axes and functions can be either manual or motorized. The hydraulically (or pneumatically or electrically) lockable/postionable joints (balls, sliding tubes etc.) are important for function this and other applications of this invention. The clamps/locators so positioned can also be targeted to aid determination of their position.

These locking joints can utilize electric brakes, or hydraulically or pneumatically actuated brakes, for example. These are momentarily activated on congrol of the control computer to stabilized the positon for welding during which time the normal robot servo axis control is turned off. Locking joints can also be manually positioned as described relative to the rapidly convertible tooling of FIG. 4 etc.

It is also recognized that the accurately repositionable tooling of FIG. 4b can be located on a moving member such as an AGV, which would allow it to be reconfigured for a different part in a different location then where the part was actually assembled.

Target application, particularly painted on or retroreflective can be done in many ways. Template application is satisfactory, as all parts similar, and templated targets are known to data base of part (via location to holes etc).

"Active" fiber optic end datums in tool or robot positioners employing remote light sources can allow the light therefrom to be sequenced rapidly as desired from datum point to point, creating unambiguous signals for the optical sensor system used to determine tool co-ordinates.

Rather then fibers ends, these target sources can be LEDs or diode lasers fed with sequentiable or distinctly modulated (e.g. at different frequencies or pulse widths) such that each can be Individually discern. One can in addition, not only geometrically discern the light source position in space, but in more sophisticated applications, the source can be phase or temporally modulated at very high rates so as to create time based range data accurate to say 0.05 mm. In this case the laser range finder can be a laser detector, with the target, being the source.

Another feature of the invention is the ability of the invention to essentially inspect its own work. This in essence results because the position of the pieces are known, but before and after the joining operation is completed. This means then that the results of the joining operation, and particularly the body shape at desired locations is automatically known through this method. Not only can statistical data be taken, which relates to the body, but it can be automatically used to correct; not only future bodies but even later portions of the assembly of the same body. This is unheard of with conventional measuring technology, which for a weld system can only hope to measure after the fact, and many times after considerable amount of time at that.

The ability of the invention to assemble numerous smaller stamped pans into an accurate, larger assembly, is important for reducing costs of manufacture (as low cost press line can be used), and in actually improving quality as over all error can be reduced or eliminated by using the addition of each additional part to drive overall error to zero (especially if parts are pre-measured, and intelligently nested together).

The photogrametric system in turn can use fixed cameras or pointing cameras, as in theodolite systems, automated in tills case of course, or can use a combination of theodolite camera type systems and range finders.

To indicate to an operator, the area he should position the locator to—two laser beams can be projected under CAD control to intersect at the approximate locater position, with TV images from the theodolite cameras used for fine positioning.

Note the desireability for multiple points, this is what drove us to big dots on RPS, can we get multiple datums put on; for example groups of laser engraved circles at known spacing, and groups of retrotargets.

In a space frame car, what about a ball swivel bolt that is locked down, so that it points outward at a certain angle. On this bolt there would be a plate. The plate would be the attaching point surface and the plate would also have targets that would determine the bolt axis. Same holds true for a fixture where one attachs NC blocks.

Feature lines with multiple points on them are useful for establishment of critical dimensions. A line in a horizontal direction would be great insofar as determining the up/down; a line in a vertical direction the fore-/aft. If we have another line at the top of the member then we can see the side to side, also with multiple points on the line. This is not necessarily a light section triangulation issue.

The advantage of targeting the robot(s) in the work area to determine their position and correct them, along with determining the part location using the vision system is important. (see also my patent on Robot Calibration). So is the time tagging of data to allow one to associate in the Robot controller, the relationship on an instantaneous basis of the forces, Part locations Robot axes locations and other variables, in order to better understated and develop the joining process, and assure quality (by for example, recording the signature of good parts, and comparing the relationships to the instant measured variables).

It is noted that the system of FIG. 5a–e allows one to accurately build up a total assembly (eg a side frame) out of small parts which may be of mediocre accuracy, this is because the error can be reduced to zero as the parts are "added up" in the joining process, as long as their design will allow a sliding or similar repoitionable fit which can be varyed to suit. This is the opposite of normal practice which tries to have as little variation as possible. Small parts of modest dimensional quality are the cheapest to stamp.

The ability of the FIG. 5 etc system to inspect its own work allows one to eliminate check fixtures, another major body shop expense, and a notorius accuracy problem. In addition, one can use the system to measure the parts and calibrate the press or earlier assembly operations on an automatic, on going basis.

It should be noted that one can in designing the part on CAD, one can call in the machine vision program to analyze the features on the part (holes, slots, edges, etc) and determine from known rules about these features, and the various photogrammetric equations of the hopefully standard workcell camera layout, wheter the part can be accurately located. If it can't, then the designer can put in other features under the prompting from the CAD to allow a satisfactory slution. Only as a last resort, (i.e. if added part features are economically unfeasible) would one like to change the cell (eg by adding cameras), which would damage its generic nature.

What is claimed is:

1. A method for assembly of members into 3 dimensional structures comprising the steps of:
    electro-optically determining the location of a plurality of datums on a first member, said datums comprising special targets, projected zone images, natural object features, or a combination thereof,
    determining from the location of said datums the position of said first member;
    positioning said first member in contact with respect to one or more second members;
    determining a force of contact between at least one point on said first member and said second member; and
    joining or otherwise assembling said first member to said second member or members.

2. A method according to claim 1 wherein the positions, of at least one, of said second members is also known through electro-optical determination of features related to it.

3. A method according to claim 1 wherein the determination of the location of datums on one of said members is made at a first location from which subsequent locations of points on the member are known.

4. A method according to claim 1 wherein said member location is determined by determining the location of a robot or other means of holding said member in a known location relative to said members.

5. A method according to claim 1 wherein one of said members is held in a known position by a least one positioning member provided with electro optically determinable datums.

6. A method according to claim 1 wherein a member part containing special datums is used in place of a normal production part and the position of special said datums are determined, and data therefrom used to calibrate said electro-optical determination.

7. A method according to claim 1 wherein said datum is applied at a previous operation used to make or assemble said member.

8. A method according to claim 1 wherein said electro-optical determination is performed using a plurality of TV Cameras 9. A method according to claim 1 wherein at least one of said datums is applied to a member as a function of other optically measured features on the same member or mating parts.

10. A method according to claim 2 wherein one of said members is firmly held in an appoximate position.

11. A method according to claim 1 and further including the step of holding at least one of said members magnetically, and de-energizing said magnetic field after the joining step.

12. A method according to claim 1 wherein said first member comprises at least a portion of the frame of a car, and wherein one of said second members is an attachment device for attaching outer body panels of said car to the frame.

13. A method according to claim 1, wherein a determination is also made of a relative position of each of said members to the other members.

14. A method according to claim 1 wherein successive members are sequentially positioned and joined to form an accurate assembly.

15. A method according to claim 14 wherein the position of each member is adjusted to determine the best fit.

16. A method according to claim 14 wherein said positioning, step includes the determining of dimensions of one member and the location of the first member after adjustment for the dimension determined.

17. A method according to claim 1 wherein a mating section of a member is drilled, sloted, cut or otherwise modified as a function of dimension and/or locations in one or more members.

18. A method according to claim 1 wherein said positioning step includes the determining of dimensions of the first member and the optimizing of the location of said second member in consideration of the dimension of said first member.

19. A method according to claim 1 wherein positional adjustment is made if the position or the force determined is not within allowed tolerances.

20. A method according to claim 1 comprising the addtional steps of: positioning said first member at a nominal location from the electro-optical system used to determine said location, and in a second step, moving said first member so that said second members are at essentially same or nominal location.

* * * * *